(12) United States Patent  
McPeak

(10) Patent No.: US 11,596,153 B2
(45) Date of Patent: Mar. 7, 2023

(54) METAL-SEMICONDUCTOR-METAL PLASMONIC DEVICE AND ABSORBER AND METHOD FOR MAKING THE SAME

(71) Applicant: Kevin Michael McPeak, Baton Rouge, LA (US)

(72) Inventor: Kevin Michael McPeak, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 16/623,281

(22) PCT Filed: Jun. 15, 2018

(86) PCT No.: PCT/US2018/037853
§ 371 (c)(1),
(2) Date: Dec. 16, 2019

(87) PCT Pub. No.: WO2018/232303
PCT Pub. Date: Dec. 20, 2018

(65) Prior Publication Data
US 2020/0196611 A1    Jun. 25, 2020

Related U.S. Application Data

(60) Provisional application No. 62/520,885, filed on Jun. 16, 2017.

(51) Int. Cl.
C02F 1/30    (2006.01)
A01N 59/16   (2006.01)
C02F 1/32    (2023.01)

(52) U.S. Cl.
CPC .............. *A01N 59/16* (2013.01); *C02F 1/30* (2013.01); *C02F 1/32* (2013.01); *C02F 2303/04* (2013.01);
(Continued)

(58) Field of Classification Search
CPC ... A01N 59/16; C02F 1/30; C02F 1/32; C02F 2303/04; C02F 2305/023; C02F 2305/10; H01L 31/085
See application file for complete search history.

(56) References Cited

U.S. PATENT DOCUMENTS 7,205,256 B2   4/2007  Kijima et al.
8,372,416 B2 * 2/2013  Kshirsagar ............ C23C 14/223
                                              424/409
(Continued)

FOREIGN PATENT DOCUMENTS

WO    2009/012397 A2    1/2009
WO    2014/169258 A1   10/2014
WO    2017/053466 A1    3/2017

OTHER PUBLICATIONS

Hao et al. "High performance optical absorber based on a plasmonic metamaterial." Applied Physics Letters, vol. 96, No. 25, p. 251104, 2010. (Year: 2010).*

(Continued)

*Primary Examiner* — Timothy C Cleveland
(74) *Attorney, Agent, or Firm* — Venable LLP; Keith G. Haddaway

(57) ABSTRACT

A metal-semiconductor-metal (MSM) plasmonic device includes a substrate; a metal layer deposited on the substrate, the metal layer being substantially reflective in at least the visible wavelength range; an oxide layer deposited on the metal layer; and gold or gold alloy nanoparticles deposited on the oxide layer.

18 Claims, 16 Drawing Sheets

(52) U.S. Cl.
CPC .... *C02F 2305/023* (2013.01); *C02F 2305/10* (2013.01)

(56) References Cited

U.S. PATENT DOCUMENTS

| | | | |
|---|---|---|---|
| 8,470,434 B2 | 6/2013 | Nghiem et al. | |
| 8,853,526 B2* | 10/2014 | Kostecki | H01L 31/07 136/255 |
| 8,906,863 B2 | 12/2014 | Cheng et al. | |
| 9,403,186 B2 | 8/2016 | Bartl et al. | |
| 2009/0118813 A1 | 5/2009 | Scheuermann et al. | |
| 2009/0209420 A1 | 8/2009 | Kalgutkar et al. | |
| 2010/0126567 A1* | 5/2010 | Kaufman | H01L 31/035227 136/252 |
| 2010/0252108 A1* | 10/2010 | Singh | H01G 9/2031 136/261 |
| 2016/0160364 A1* | 6/2016 | Juluri | C01B 3/042 205/91 |
| 2016/0227786 A1 | 8/2016 | Quidant et al. | |
| 2017/0159987 A1 | 6/2017 | Kepner et al. | |

OTHER PUBLICATIONS

Hill et al., "Effect of Electrolytes on the Selectivity and Stability of n-type WO3 Photoelectrodes for Use in Solar Water Oxidation", The Journal of Physical Chemistry C, vol. 116, 2012, pp. 7612-7620.
Wang et al., "Ag/AgBr/WO3·H2O: Visible-Light Photocatalyst for Bacteria Destruction", Inorganic Chemistry, vol. 48, 2009, pp. 10697-10702.
Banset et al., "α-Fe2O3 Nanocolumns and Nanorods Fabricated by Electron Beam Evaporation for Visible Light Photocatalytic and Antimicrobial Application", ACS Applied Material & Interfaces, vol. 5, 2013, pp. 2085-2095.
Meissner et al., "Photoelectrochemistry of Cadmuim Sulfide. 1. Reanalysis of Photocorrosion and Flat-Band Potential", J. Phys Chem., vol. 92, 1988, pp. 3476-3483.
Huang et al., "Preparation of cuprous oxides with different sizes and their behaviors of adsorption, visible-light driven photocatalysis and photocorrosion" Solid State Sciences, vol. 11, 2009, pp. 129-138.
Clavero, "Plasmon-induced hot-electron generation at nanoparticle/metal-oxide interfaces for photovoltaic and photocatalytic devices", Nature Photonics, vol. 8, Feb. 2014, pp. 95-103.
Brongersma et al., "Plasmon-induced hot carrier science and technology", Nature Nanotechnology, vol. 10, Jan. 2015, pp. 25-34. (11 pages total).
Manjavacas et al., "Plasmon-Induced Hot Carriers in Metallic Nanoparticles", ACS Nano, vol. 8, No. 8, 2014, pp. 7630-7638.
Mukherjee et al., "Hot Electrons Do the Impossible: Plasmon-Induced Dissociation of H2 on Au", Nano Letters, vol. 13, 2013, pp. 240-247.
Tian et al., "Mechanisms and Applications of Plasmon-Induced Charge Separation at TiO2 Films Loaded with Gold Manoparticles", JACS Articles, vol. 127, 2005, pp. 7632-7637.
Wu et al., "Efficient hot-electron transfer by a plasmon-induced interfacial charge-transfer transition", Science, vol. 349, Issue 6248, Aug. 7, 2015, pp. 632-635. (5 pages total).
Foote, "Mechanisms of Photosensitized Oxidation" Science, vol. 162, No. 3857, Nov. 29, 1968, pp. 963-970. (9 pages total).
Benabbou et al., "Photocatalytic inactivation of *Escherischia coli* Effect of concentration of TiO2 and microorganism, nature, and intensity of UV irradiation", Applied Catalysis B Environmental, vol. 76, 2007, pp. 257-263.
Cho et al., "Linear correlation between inactivation of *E. coli* and OH radical concentration in TiO2 photocatalytic disinfection", Water Research, vol. 38, 2004, pp. 1069-1077.
Cho et al., "Different Inactivation Behaviors of MS-2 Phafe and *Escherichia coli* in TiO2 Photocatalytic Disinfection" Applied and Environmental Microbiology, vol. 71, No. 1, Jan. 2005, pp. 270-275.
Yan et al., "Roles of H2O2 and OH• radical in bactericidal action of immobilized TiO2 thin-film reactor: An ESR study", Journal of Photochemistry and Photobiology Chemistry, vol. 207, 2009, pp. 153-159.
Gligorovski et al., "Environmental Implications of Hydroxl Radicals (•OH)", Chemical Reviews, vol. 115, 2015, pp. 13051-13092.
Bruxton, "Critical Review of Rate Constants for Reactions of Hydrated Electrons, Hydrogen Atoms and Hydroxyl Radicals (•OH/•O-) in Aqueous Solution", Journal of Physical and Chemical Reference Data, vol. 17, No. 2, 1988, pp. 513-886. (887 pages total).
Hotze et al., "Mechanisms of Bacteriophage Inactivation via Singlet Oxygen Generation in UV Illuminated Fullerol Suspensions", Envrion. Sci. Technol, vol. 43, No. 17, 2009, pp. 6639-6645.
Huang et al., "Type I and Type II Mechanisms of Antimicrobial Photodynamic Therapy: An In Vitro Study on Gram Negative and Gram-Positive Bacteria", Lasers in Surgery and Medicine, vol. 44, 2012, pp. 490-499.
Loeb et al., "Beyond the Pipeline: Assessing the Efficiency Limits of Advanced Technologies for Solar Water Disinfection", Environmental Science & Technology Letters, vol. 3, pp. 73-80.
Jayanti et al., "Low-temperature enhancement of plasmonic performance in silver films", Optical Materials Express, vol. 5, No. 5, May 1, 2015, pp. 1147-1155.
Zhou et al., "A Stable Nonfluorescent Derivative of Resorufin for the Fluorometric Determination of Trace Hydrogen Peroxide: Applications in Detecting the Activity of Phagocyte NADPH Oxidase and Other Oxidases", Analytical Biochemistry, vol. 253, Article No. AB972391, 1997, pp. 162-168.
Sundararaman et al., "Theoretical predictions for hot-carrier generation from surface plasmon decay", Nature Communications, vol. 5, No. 5788, pp. 1-8.
Zodrow et al., "Polysulfone ultrafiltration membranes impregnated with silver nanoparticles show improved biofouling Yesistence and virus removal", Water Research, vol. 43, 2009, pp. 715-723.
Kennedy Jr. et al., "Methodology for Enumeration of Coliphages in Foods", Applied and Environmental Microbiology, vol. 51, No. 5, 1986, pp. 956-962.
Cho et al., "Visible Light Sensitized Inactivation of MS-2 Bacteriophage by a Cationic Amine-Functionalized C60 Derivative", Envrion. Sci. Technol., vol. 44, 2010, pp. 6685-6691.
Wilkinson et al., "Rate Constants for the Decay and Reactions of the Lowest Electronically Excited Singlet State of Molecular Oxygen in Solution. An Expanded and Revised Compilation", Journal of Physical and Chemical Reference Data, vol. 24, 1995, pp. 663-1021.
Davies, "Singlet oxygen-mediated damage to proteins and its consequences", Biochemical and Biophysical Research Communications, vol. 305, 2003, pp. 761-770.
Wright et al., "Singlet Oxygen-mediated Protein Oxidation: Evidence for the Formation of Reactive Side Chain Peroxides on Tyrosine Residues", Photochemisty and Photobiology, vol. 76, No. 1, 2002, pp. 35-46.
Fiers et al., "Complete nucleotide sequence of bacteriophage MS2 RNA: primary and secondary structure of the replicase gene", Nature, vol. 260, Apr. 8, 1976. pages 500-507. (9 pages total).
Deans et al., "Biochemistry and pathology of radical-mediated protein oxidation", Biochem. J., vol. 324, 1997, pp. 1-18.
Grune et al., "Protein Oxidation and Proteolysis By the Nonradical Oxidents Singlet Oxygen or Peroxynitrite", Free Radical Biology & Medicine, vol. 30, No. 11, 2001, pp. 1243-1253.
Ivask et al., "Genome-Wide Bacterial Toxicity Screening Uncovers the Mechanisms of Toxicity of a Cationic Polystyrene Nanomaterial", Environmental Science & Technology, vol. 46, 2012, pp. 2398-2405.
Cho et al., "*Escherichia coli* Inactivation by UVC-Irradiated C60: Kinetics and Mechanisms" Environmental Science & Technology, vol. 45, 2011, pp. 9627-9633.
Matsuo et al., "Highly Sensitive Hepatitis B Surface Antigen Detection By Measuring Stable Nitroxide Radical Formation With ESR Spectroscopy", Free Radical Biology & Medicine, vol. 25, No. 8, 1998, pp. 929-935.

(56) References Cited

OTHER PUBLICATIONS

Yamakoshi et al., "Active Oxygen Species Generated from Photoexcited Fullerene (C60) as Potential Medicines O2—•versus 1O2", J Am. Chem. Soc., vol. 125, 2003, pp. 12803-12809.

Hassan et al., "Field and Laboratory Investigation of Photocatalytic Pavements", Gulf COast Research Center for Evacuation and Transportation Resiliency, Jan. 2012, pp. 1-27. (35 pages total).

"Evaluation Of Ecological Impacts From Highway Development", U.S. Environmental Protection Agency, Apr. 1994, pp. 1-69 (74 pages total).

Kuhns et al., "Remote sensing of PM, NO, CO and HC emission factors for on-road gasoline and diesel engine Vehicles in Las Vegas, NV", Science of the Total Environment, vol. 322, 2004, pp. 123-137.

Baldauf et al., "Traffice and Meteorological Impacts on Near-Road Air Qualityt: Summary of Methods and Trends from the Raleight Near-Road Study", J. Air & Waste Manage. Assoc., vol. 58, Jul. 58, pp. 865-878.

Berkowicz et al., "Traffic pollution modelling and emission data", Environmental Modelling & Software, vol. 21, 2006, pp. 454-460.

Thoma et al., "Characterization of Near-Road Pollutant Gradients Using Path-Untegrated Optical Remote Sensing", J. Air & Waste Manage. Assoc., vol. 58, pp. 879-890. (13 pages total).

PCT/US2018/037853 International Search Report dated Aug. 13, 2018.

PCT/US2018/037853 Written Opinion dated Aug. 13, 2018.

European Supplementary Search Report dated Oct. 14, 2020 in corresponding European Application No. 188118202.6.

Shiraishi et al., "Sunlight-Driven Hydrogen Peroxide Production from Water and Molecular Oxygen by Metal-Free Photocatalysts", Angew. Chem., vol. 126, 2014, pp. 13672-13677.

Zhou et al., "Self-assembly of highly efficient, broadband plasmonic absorbers for solar steam generation", Sci. Adv., vol. 2, No. e1501227, Apr. 8, 2016, pp. 1-8.

Liu et al., "Rapid water disinfection using vertically aligned MoS2 nanofilms and visible light", Nature Nanotechnology, Aug. 15, 2016, pp. 1-8.

Giugni et al., "Hot-electron nanoscopy using adiatic compression of surfact plasmons", Nature Nanotechnology, vol. 8, Nov. 2013, pp. 845-852 (9 pages total).

Shiraishi et al., "Highly Selective Production of Hydrogen Peroxide on Graphitic Carbon Nitride (g-C3N4) Photocatalyst Activated by Visible Light", ACS Catalysis, vol. 4, 2014, pp. 774-780.

Cooper et al., "Hydrogen Peroxide Concentration In a Northern Lake: Photochemical Formation and Diel Variability", Environ. Sci. Technol., vol. 23, No. 11, 1989, pp. 1425-1428.

Asghar et al., "Advanced oxidation processes for in-situ production of hydrogen peroxide/hydroxyl radical for textile wastewater treatment: a review", Journal of Cleaner Production, vol. 87, 2015, pp. 826-838.

Keane et al., "Solar photocatalysis for water disinfection: materials and reactor design", Catalysis Science & Technology, vol. 4, 2014, pp. 1211-1226.

Ogilby, "Singlet oxygen: there is indeed something new under the sun", Chem. Soc. Rec., vol. 39, 2010, pp. 3181-3209.

Okuda et al., "Lifetime and diffusion coefficient of active oxygen species generated in TiO2 solutions", Physical Chemistry Chemical Physics, vol. 11, 2009, pp. 2287-2292.

McPeak et al., "Plasmonic Films Can Easily Be Better: Rules and Recipes", ACS Photonics, vol. 2, 2015, pp. 326-333.

McPeak et al., "Complex Chiral Colloids and Surfaces via High-Index Off-Cut Silicon", Nano Letters, vol. 14, 2014, pp. 2934-2940.

McPeak et al., "Ultraviolet Plasmonic Chirality from Colloidal Aluminum Nanoparticles Exhibiting Charge-Selective Protein Detection", Advance Materials, vol. 27, 2015, pp. 6244-6250.

Park et al., "Fabrication of Smooth Patterned Structures of Refractory Metals Semiconductors, and Oxides via Template Stripping", ACS Applied Materials & Interfaces, vol. 5, 2013, pp. 9701-9708.

Lindquist et al., "Engineering metallic nanostructures for plasmonics and nanophotonics", Rep. Prog. Phys., vol. 75, 2012, pp. 1-61. (62 pages total).

Kress et al., "Wedge Waveguides and Resonators for Quantum Plasmonics", Nano Letters, vol. 15, 2015, pp. 6267-6275.

McPeak et al., "Chemical Bath Deposition of ZnO Nanowires at Near-Neutral pH Conditions without Hexamethylenetetramine (HMTA): Understanding the Role of HMTA in ZnO Nanowire Growth", Langmuir, vol. 27, 2011, pp. 3672-3677.

McPeak et al., "In Situ X-ray Absorption Near-Edge Structure Spectroscopy of ZnO Nanowire Growth During Chemical Bath Deposition", Chemistry of Materials, vol. 22, 2010, pp. 6162-6170.

McPeak et al., "Microreactor Chemical Bath Deposition of Laterally Graded Cd1-xZnxS Thin Films: A Route to High-Throughput Optimization for Photovoltaic Buffer Layers", Chemistry of Materials, vol. 25, 2013, pp. 297-306.

McPeak et al., "ZnO Nanowires Grown by Chemical Bath Deposition in a Continuous Flow Microreactor", Crystal Growth & Design, vol. 9, No. 10, 2009, pp. 4538-4545.

McPeak et al., "Microreactor for High-Yield Chemical Bath Deposition of Semiconductor Nanowires: ZnO Nanowires Case Study", Ind. Eng. Chem. Res., vol. 48, 2009, pp. 5954-5961.

Guo et al., "Photocatalytic inactivation of human adenovirus 40: Effect of dissolved organic matter and prefiltration", Seperation and Purification Technology, vol. 193, 2018, pp. 193-201.

Snow et al., "Cationic Fullerene Aggregates with Unprecedented Virus Photoinactivation Efficiencies in Water", Environmental Science & Technology Letters, vol. 1, 2014, pp. 290-294.

Snow et al., "Functionalized Fullerenes in Water: A Closer Look", Environmental Science & Technology, vol. 49, 2015, pp. 2147-2155.

Snow et al., "Photochemical and Photophysical Properties of Sequentially Functionalized Fullerenes in the Aqueous Phase", Environmental Science & Technology, vol. 46, 2012, pp. 13227-13234.

Hazen, "Water-Supply and Public Health" Public Health Papers and Reports, vol. 17, 1891, pp. 74-79.

Shannon et al., "Science and technology for water purification in the coming decades" Nature, vol. 452, Mar. 20, 2008, pp. 301-310. (11 pages total).

McGuigan et al., "Solar disinfection of drinking water contained in transparent plastic bottles : characterizing the bacterial inactivation process", Journal of Applied Microbiology, vol. 84, 1998, pp. 1138-1148.

Gates, "Spectral Distribution of Solar Radiation at the Earth's Surface" Science, vol. 151, No. 151, Feb. 4, 1966, pp. 523-529. (8 pages total).

"Progress on Drinking Water and Sanitation 2012 Update", UNICEF and World Health Organization, 2012. (66 pages total).

Downes et al., "Researches on the Effect of Light upon Bacteria and other Organisms", Proceedings of the Royal Society of London, vol. 26, 1877, pp. 488-500. (14 pages total).

Acra et al., "Disinfection of oral rehydration solutions by sunlight", The Lancet, vol. 312, Issue No. 8206, 1980, pp. 12576-1258. (6 pages total).

Sommer et al., "SODIS—an emerging water treatment process", J. Water SRT—Aqua, vol. 46, No. 3, 1997, pp. 127-137.

McGuigan et al., "Solar water disinfection (SODIS): A review from bench-top to roof-top", Journal of Hazardous Materials, vol. 235-236, 2012, pp. 29-46.

Fujushima et al., "Electrochemical Photolysis of Water at a Semiconductor Electrode", Nature, vol. 238, Jul. 7, 1972, pp. 37-38.

Houas et al., "Photocatalytic degradation pathway pf a methylene blue in water", Applied Catalysis B: Environmental, vol. 31, 2001, pp. 145-157.

Bahnemann et al., "Mechanistic Studies of water detoxification in illuminated TiO2 suspensions", Solar Energy Materials, vol. 24, 1991, pp. 564-583.

Maillard et al., "Comparative Effects of The TiO2-UV, H2O2-UV, H2O2—Fe2+ Systems On the Disappearance Rate of Benzamide and 4-Hydrooxybenzamide in Water", Chemosphere, vol. 24, No. 8, 1992, pp. 1085-1094. (10 pages total).

(56) References Cited

OTHER PUBLICATIONS

Herrmann et al., "Heterogeneous photocatalysis: an emerging technology for water treatment", Catalysis Today, vol. 17, 1993, pp. 7-20.

Prairie et al., "An Investigation of TiO2 Photocatalysis for the Treatment of Water Contaminated with Metals and Organic Chemicals", Environ Sci. Technol., vol. 27, No. 9, 1993, pp. 1776-1782.

Maurino et al., "Sustained production of H2O2 on irradiated TiO2—fluoride systems", Chem, Commun., 2005, pp. 2627-2629.

Tsukamoto et al., "Photocatalytic H2O2 Production from Ethanol/O2 System Using TiO2 Loaded with Au—Ag Bimetallic Alloy Nanoparticles", ACS Catalysis, vol. 2, 2012 pp. 599-603.

Teranishi et al., "Temperature- and pH-Dependence of Hydrogen Peroxide Formation from Molecular Oxygen by Gold Nanoparticle-Loaded Titanium(IV) Oxide Photocatalyst" The Journal of Physical Chemistry C, vol. 120, 2016, 1083-1088.

Teranishi et al., "In Situ Liquid Phase Synthesis of Hydrogen Peroxide from Molecular Oxygen Using Gold Nanoparticle-Loaded Titanium(IV) Dioxide Photocatalyst", J. Am. Chem. Soc., vol. 132, 2010, pp. 7850-7851.

Kormann et al., "Photocatalytic Production of H2O2 and Organic Peroxides in Aqueous Suspensions of TiO2, ZnO, and Desert Sand", Environ. Sci. Technol., vol. 22, No. 7, 1988, pp. 798-806.

Matsunaga et al., "Photoelectrochemical sterilization of microbial cells by semiconductor power", FEMS Microbiology Letters, vol. 29, 1985, pp. 211-214.

Karunakaran et al., "Cu-doped TiO2 nanoparticles for photocatalytic disinfection of bacteria under visible light", Journal of Colloid and Interface Science, vol. 352, 2010, pp. 68-74.

Karunakaran et al., "Visible light photocatalytic disinfection of bacteria by Cd—TiO2", Catalysis Communication, vol. 12, 2011, pp. 826-829.

Li et al., "Study of Au/Au3+—TiO2 Photocatalysts toward Visible Photooxidation for Water and Wastewater Treatment", Environ. Sci. Technol., vol. 35, 2001, pp. 2381-2387.

* cited by examiner

METAL-SEMICONDUCTOR-METAL PLASMONIC DEVICE AND ABSORBER AND METHOD FOR MAKING THE SAME

CROSS-REFERENCE TO RELATED APPLICATIONS

The present application claims priority benefit to U.S. Provisional Patent Application No. 62/520,885 filed on Jun. 16, 2017, the entire content of which is incorporated herein by reference. All references cited anywhere in this specification, including the Background and Detailed Description sections, are incorporated by reference as if each had been individually incorporated.

BACKGROUND

1. Technical Field

The present invention relates to a metal-semiconductor-metal (MSM) plasmonic device and absorbers and method of making the same. In particular, some disclosed embodiments relate to visible-light-driven photo-disinfection of waterborne pathogens using metal-semiconductor-metal (MSM) plasmonic absorbers.

2. Discussion of Related Art

Harnessing solar energy to disinfect drinking water has been employed for almost 2,000 years. Solar disinfection is a sustainable process and therefore has clear advantages over disinfection or filtration methods which require anthropogenic energy input. In 1877 Downes and Blunt were the first to investigate the bactericidal effects of the sun, but it was not until 1984 when Acra et al. showed that sunlight could be used to disinfect contaminated water for use in oral rehydration solutions. SODIS—"Solar water disinfection." is currently one of the most widely used methods to purify water in the developing world. The major appeal of SODIS is its simplicity. A plastic bottle is filled with contaminated water and placed on a roof for at least 6 hrs. UV-A light (315-400 nm) results in in situ formation of reactive oxygen species (ROS) (e.g., singlet oxygen, superoxide, hydrogen peroxide, and hydroxyl radical) resulting in DNA damage while elevated temperatures (greater than 45° C.) inhibit DNA repair mechanisms in cells, together resulting in synergistic pathogen inactivation. However, non-catalytic solar disinfection routes such as SODIS are slow, taking at least 6 hrs to disinfect water. Furthermore, some protozoa, such as cysts of Acanthamoeba polyphagam, are highly resistant to SODIS under normal sunlight and temperature conditions. Heterogeneous photo-catalysts have been pursued to increase the pathogen inactivation rate by extending the photoactive region into the visible and generating more reactive oxygen species (ROS).

Fujishima and Honda's pioneering 1972 work showing the photolysis of water by $TiO_2$ sparked countless studies on $TiO_2$ and other semiconductor photo-catalysts. $TiO_2$ is a wide band gap semiconductor which has been investigated for the past 50 years. Research on the photo-disinfection of water using $TiO_2$ started in the early 1990's and has received significant attention since. One of the significant challenges with in situ $H_2O_2$ production from $TiO_2$ is the strong adsorption of peroxide complexes on the $TiO_2$ surface which blocks the formation of $H_2O_2$. Pelizzetti et al. showed that fluoride coated $TiO_2$ mitigated the formation of surface ≡Ti—OOH complexes allowing photo-generation (360 nm UV excitation) of up to 1.25 μM of $H_2O_2$ in situ in the presence of hole-scavenger formic acid at a pH of 3.1. Unfortunately, desorption of toxic fluoride ions and the low pH make this approach unsuitable for drinking water purification. Another route to avoiding the ≡Ti—OOH complexes on $TiO_2$ is to load Au or Au—Ag alloy nanoparticles onto a $TiO_2$ particle. Due to the Schottky barrier at the metal-semiconductor interface, UV excitation of these structures moves the electron to the metal nanoparticle allowing $O_2$ reduction and subsequently form $H_2O_2$ on the metal nanoparticle, completely avoiding ≡Ti—OOH complex formation. ZnO, another wide band gap semiconductor, was reported by Hoffman et al. to form over 100 μM $H_2O_2$ in situ under UV illumination of ZnO nanoparticles. ZnO does not readily form the ≡Zn—OOH complexes allowing a more straightforward approach to in situ $H_2O_2$ formation than $TiO_2$. More recently, Peral et al. demonstrated that with the addition of a $NO_3$— reductant, UV excited ZnO nanoparticles generated 780 μM $H_2O_2$ in 30 min at a pH of 7.9. However, in situ $H_2O_2$ from $TiO_2$ and ZnO is limited to UV excitation since both materials are wide band gap semiconductors with band gaps of ~3.3 eV. One common approach to extending the absorption of wide band gap photocatalyst into the visible is doping via group VIII metals and transition metals ions. Matsunaga et al., in 1985, was one of the first to report photocatalytic disinfection from doped $TiO_2$. Pt—$TiO_2$ powders were used to inactivate *Lactobacillus acidophilus, Saccharomyces cerevisiae*, and *Escherichia coli* within 2 hrs. More recently, Karunakaran et al. doped $TiO_2$ with 2 at % Cu decreasing the band gap from 3.3 eV to 2.83 eV. These Cu—$TiO_2$ nanoparticles showed photocatalytic disinfection of *E. coli* under broadband visible light. Noble metal ion doping of $TiO_2$ has also been shown to improve the photoactivity of $TiO_2$ in the visible. Li et al. synthesized $Au^{3+}$ doped $TiO_2$ photo-catalyst by the sol-gel method and showed that $Au^{3+}$ doping enhanced the photo-degradation rate of methylene blue dye significantly under visible light.

Narrow band semiconductors for visible-light-driven photo-disinfection reactions have also been investigated. $WO_3$ and $Fe_2O_3$ were initially explored, providing ROS under visible irradiation and disinfecting pathogens. However, many of these narrow band semi-conductors suffer from photo-corrosion, making them unstable for long term use. $C_3N_4$ with a band gap 2.7 eV was also used in production of $H_2O_2$ under visible light but with less than 10% absorption beyond 500 nm.

Recently, nanofilms of 2D-$MoS_2$ were reported by Cui et al. with >99.999% inactivation of bacteria in 20 min and 4 μM of $H_2O_2$ under 2 hrs in sunlight. However, 2D-$MoS_2$ only absorbs a maximum of 20% of visible light at any wavelength, severely limiting the potential for this material to efficiently convert sunlight into ROS.

Therefore, a need remains for a device and/or a material that would solve the above and other problems of existing materials and technologies.

SUMMARY OF THE DISCLOSURE

An aspect of the present disclosure is to provide a metal-semiconductor-metal (MSM) plasmonic device. The device includes a substrate; and a metal layer deposited on the substrate, the metal layer being substantially reflective in at least the visible wavelength range. The device also includes an oxide layer deposited on the metal layer; and gold or gold alloy nanoparticles deposited on the oxide layer.

Another aspect of the present disclosure is to provide a method of making a metal-semiconductor-metal (MSM)

plasmonic device. The method includes depositing a metal layer on a substrate, the metal layer being substantially reflective in at least the visible wavelength range; depositing an oxide layer on the metal layer; and depositing gold or gold alloy nanoparticles on the oxide layer.

BRIEF DESCRIPTION OF THE DRAWINGS

The present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. All references cited anywhere in this specification, including the Background and Detailed Description sections, are incorporated by reference as if each had been individually incorporated.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention.

Figure 1:
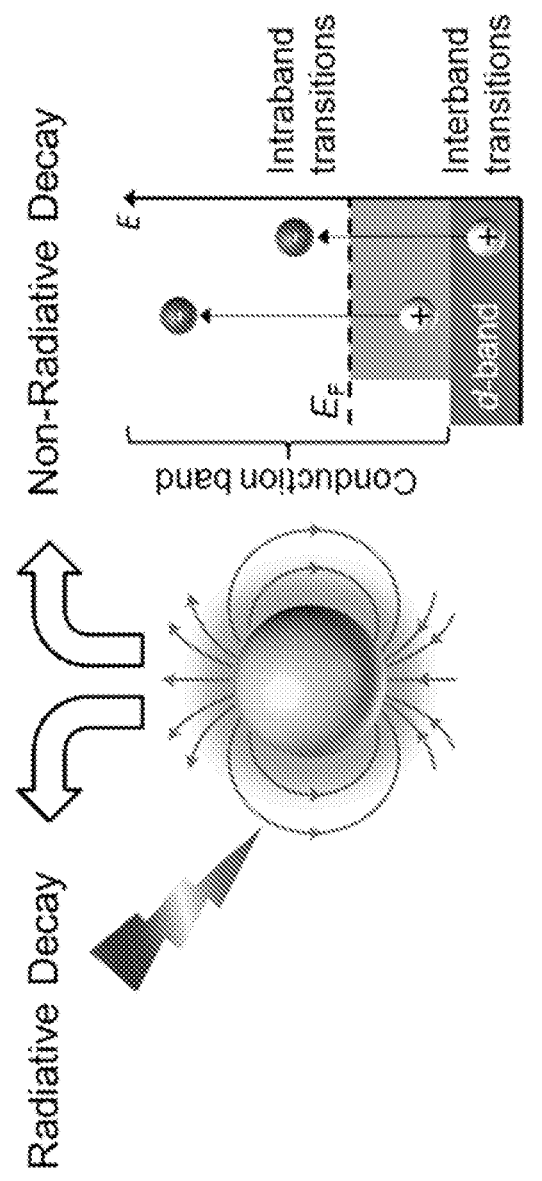
FIG. 1 shows schematically radiative and non-radiative plasmon decay routes for metal nanoparticles, according to an embodiment of the present disclosure.

FIG. 1 shows schematically radiative and non-radiative plasmon decay routes for metal nanoparticles, according to an embodiment of the present disclosures. Local surface plasmon resonances (LSPR) can exist on metal nanostructures when the free electrons in the metal oscillate in resonance with incident electromagnetic radiation resulting in large, localized electromagnetic fields. The energy in a LSPR will decay radiatively or non-radiatively depending on the geometry, optical properties, and electronic properties of the metal, as depicted schematically in FIG. 1. Radiative decay results in a photon emission whereas non-radiative decay generates hot carriers (e.g., highly energetic electrons and holes not in thermodynamic equilibrium) via Landau dampening. However, small nanoparticles favor the non-radiative decay route resulting in more efficient hot-carrier generation. The hot carriers can come from intraband or interband transitions in the metal nanoparticles, as shown on the right side of FIG. 1. Although, the size of the nanoparticles is indicated as being less than 40 nm in FIG. 1, as it must be appreciated, this non-radiative effect is not limited to this specific size but can encompass a range of sizes (e.g., between 10 nm and 50 nm) or various nanoparticles at various sizes in the nanometer range depending on the type of the nanoparticle used.

Figures 2A, 2B:
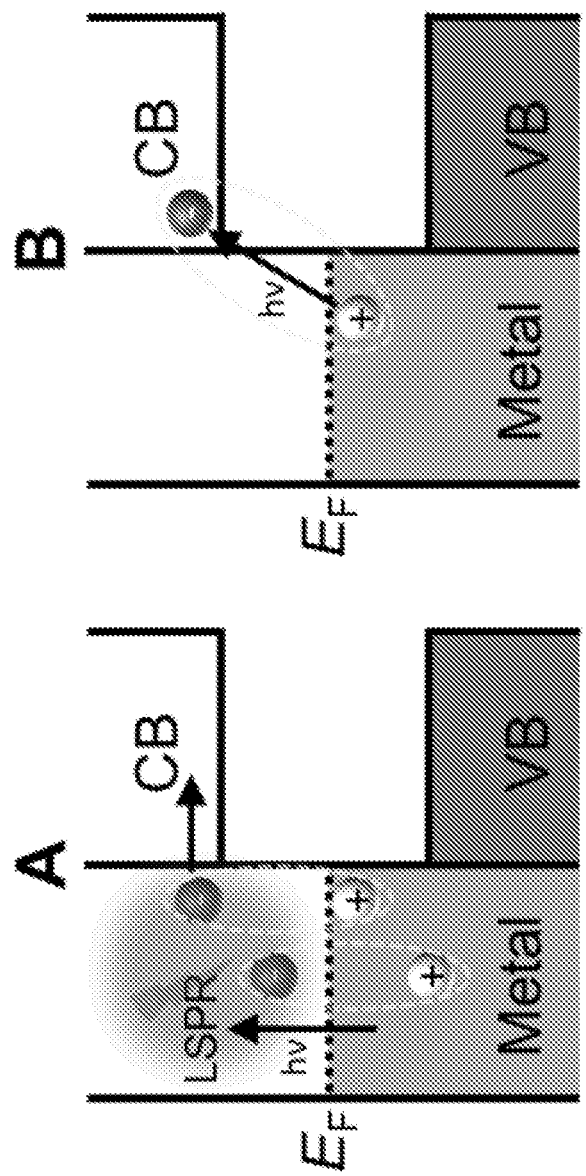
FIG. 2A depicts schematically a Plasmon-induced hot-electron transfer (PHET) mechanism for hot-electron transfer at the metal-semiconductor interface, according to an embodiment of the present disclosure.
FIG. 2B depicts schematically a plasmon-induced metal-to-semiconductor interfacial charge transfer transition (PICTT) mechanism for direct hot-electron transfer at the metal-semiconductor interface, according to another embodiment of the present disclosure.

FIG. 2A depicts schematically a Plasmon-induced hot-electron transfer (PHET) mechanism for hot-electron transfer at the metal-semiconductor interface, according to an embodiment of the present disclosure. Hot-carriers in a metal are extremely short lived and will decay into phonon vibrations (e.g. heat) if not rapidly collected. Typical lifetimes of hot-carriers in metal nanostructures are on the order of 100 fs, or less. Plasmon-induced hot-electron transfer (PHET) is a common technique employed to capture these hot carriers. A Schottky barrier is created at a metal-semiconductor junction. Hot electrons which satisfy the energy and momentum constraints at the junction are injected into the semiconductor leaving a hot hole in the metal. This results in charge separation which mitigates recombination, a common issue in semiconductor photo-catalysts. These charge separated hot-carriers can be utilized to drive chemical reactions at the metal-semiconductor surfaces.

However, PHET exhibits low charge injection efficiency (e.g., 1%) into the adjoining semi-conductor due to the rapid relaxation of hot electrons through electron-electron scattering events. Plasmonic-induced metal-semiconductor charge injection efficiency could be improved by avoiding electron-electron scattering events. This can be performed by direct plasmon-induced electron transfer process in Au—CdSe nanoparticles with charge injection efficiencies >24%. As it will be described further in detail in the following paragraphs, in embodiments, the nanoparticles used can be nanorods. For example, Au—CdSe nanorods can be used as the nanoparticles deposited on an oxide layer (e.g., ZnO) in some embodiments of the present disclosure.

FIG. 2B depicts schematically a plasmon-induced metal-to-semiconductor interfacial charge transfer transition (PICTT) mechanism for direct hot-electron transfer at the metal-semiconductor interface, according to another embodiment of the present disclosure. The PICTT process can be explained by strong interdomain coupling and mixing between the plasmon and semiconductor energy levels which lead to a new plasmon decay pathway. PICTT results in the direct generation of a hot electron in the adjoining semiconductor and a hot hole in the metal. Therefore, PICTT can be employed, for example, by engineering metal-semiconductor-metal (MSM) structures which can exhibit relatively large electric field intensities at the metal-semiconductor interface. Strong localized electro-magnetic fields have been shown to facilitate inter-domain coupling between metal-semiconductor nanostructures and more efficient hot electron charge transfer.

In an embodiment, photoactive materials can produce a range of different reactive oxygen species (ROS) that can be used for disinfection applications. Semiconductor photo-catalysts generally yield hydroxyl radicals (●OH) as an endpoint of the photochemical pathways. The hydroxyl radicals can be used, for example, to inactivate both viruses and gram-negative bacteria, amongst other organisms. A distinction between surface-mediated and bulk-phase inactivation of $E.\ coli$ and MS2 bacteriophage can be made. Radical ●OH effectively inactivates $E.\ coli$ in both bulk and surface-bound radicals, while MS2 is primarily inactivated via free (bulk phase) radicals. It can be shown that $H_2O_2$ likely plays a minor role in inactivating $E.\ coli$ in the UV-$TiO_2$ system. A distinction between ●OH and $H_2O_2$ roles can be in the present context as the lifetimes of these ROS in natural waters vary by many orders of magnitude. Indeed, $H_2O_2$ in a natural lake had a half-life of ca. 8 hours, while the radical ●OH is known to be very short-lived with reaction rates at or near diffusion limits for various organic compounds, halides, and other ions in solution. Even singlet oxygen ($^1O_2$), a longer-lived ROS which can effectively inactivate bacteria and viruses has a short lifetime and diffusion length in water (ca. 3.5 s and 150 nm, respectively). Collectively, photo-inactivation strategies relying solely on short-lived ROS may not be an efficient route for disinfection. Therefore, the present invention utilizes photocatalytic materials paired with other advanced oxygen processes (AOP) to achieve effective disinfection.

In an embodiment, an AOP which efficiently absorbs broadband sunlight and rapidly produces charge separated carriers for the in situ production of ROS and subsequent inactivation of waterborne pathogens is provided. In an embodiment, the AOP is selected to overcome diffusion limitations by either utilizing a high-surface-to-volume reactor or by utilizing long-lived ROS. According to various embodiments of the present disclosure, the combined multi-functional system employs a high surface-to-volume photoreactor that yields highly reactive intermediary ROS (e.g., $O_2●^-$) while promoting the formation of the long-range $H_2O_2$, directly addressing diffusion limitations on two fronts. The present multi-functional system also overcomes the three main limitations of photocatalysis including visible light absorption, diffusion limitations, and the limitations of utilizing only one ROS.

Figure 3:
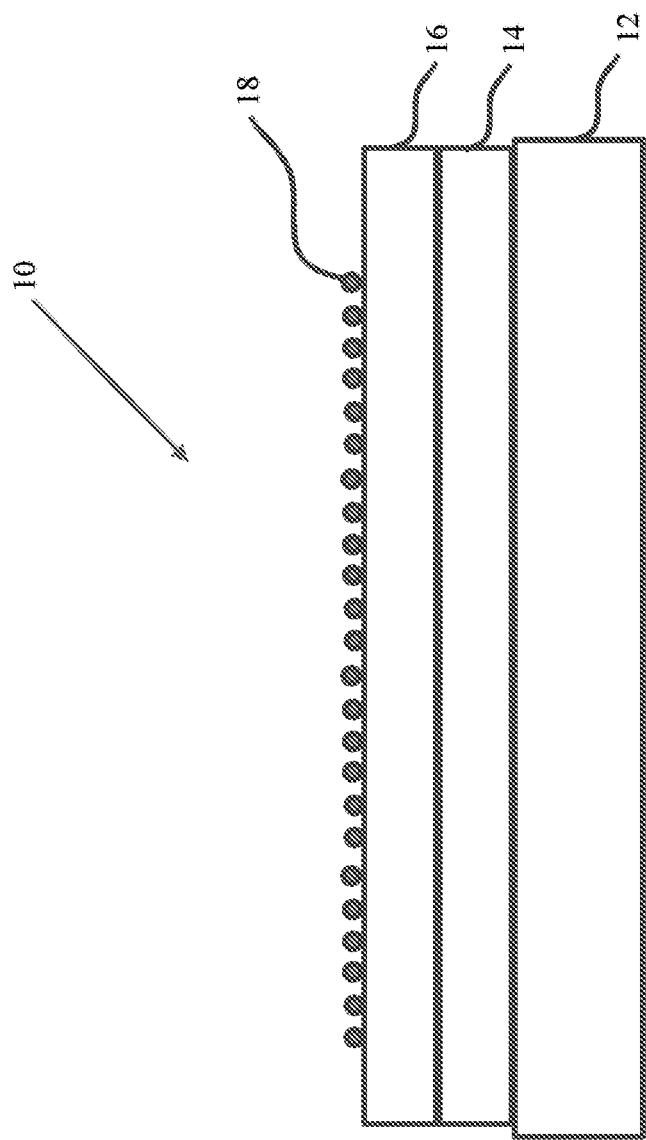
FIG. 3 depicts schematically a metal-semiconductor-metal (MSM) plasmonic device, according to an embodiment of the present disclosure.

FIG. 3 depicts a schematically a metal-semiconductor-metal (MSM) plasmonic device, according to an embodiment of the present disclosure. The MSM device 10 comprises a substrate 12. The substrate can be, for example, silicon, glass or polyimide film. In an embodiment, the substrate 12 is silicon (e.g., crystal Si in (100) orientation). In an embodiment, a size of the substrate 12 can be 25 mm×25 mm glass, for example. In an embodiment, the substrate can be flexible strips (e.g., from a polymer material) than can inserted into a container such as a polyethylene terephthalate (PET) bottle. The device 10 further includes a metal layer (e.g., Al, Cu, Au or Ag layer) 14 deposited on the substrate 12. In an embodiment, the metal layer is an Al layer. In an embodiment, the metal layer 14 is reflective at least in the visible wavelength range. The term reflective is used herein to mean that light at least 90% of light is reflected at a desired wavelength. In an embodiment, the metal layer 14 is an Al film that is rapidly thermally evaporated on the substrate (e.g., Si) 12. The device 10 further includes an oxide layer (e.g. ZnO, $WO_3$, $TiO_2$, $SrTiO_3$, $SnO_2$, or $BiVO_4$ layer) 16. In an embodiment, the oxide layer is a zinc oxide (ZnO) layer 16 formed by, for example, spin coating a sol-gel zinc oxide (ZnO) on the metal layer (e.g., aluminum layer) 14. In an embodiment, the sol-gel ZnO layer 16 is then converted into a (0001) oriented ZnO layer via annealing at, for example, 400° C. for 20 min. Magnetron sputtering can also be used to deposit the oxide layer at lower temperatures. In an embodiment, a concentration of the ZnO sol-gel precursor and spin speed can be adjusted to obtain 50 nm thick ZnO films, as measured by reflectometry. The device 10 also includes nanoparticles (e.g., Au nanoparticles or Au-alloy nanoparticles such as Au—Cu or Au—Ag) 18 deposited on the sol-gel oxide film 16. In an embodiment, to synthesize the Au nanoparticles, by photo-deposition from a gold salt 14. Gold (Au) nanoparticles and alloys of Gold can also be deposited on the ZnO/Al stack by other techniques, including but not limited to, pulsed laser dewetting of thin metal films, chemisorption of colloidal metal nanoparticles to a self-assembled monolayer on the oxide surface, thermal evaporation of metal nanoparticles through a colloidal nanosphere mask and spray deposition of colloidal metal nanoparticle on a sol-gel oxide film. Metal nanoparticle spray deposition and evaporation through a mask have the potential added benefit of embedding the metal nanoparticle into an oxide layer. This could benefit the hot-electron injection process.

Figures 4A, 4B:
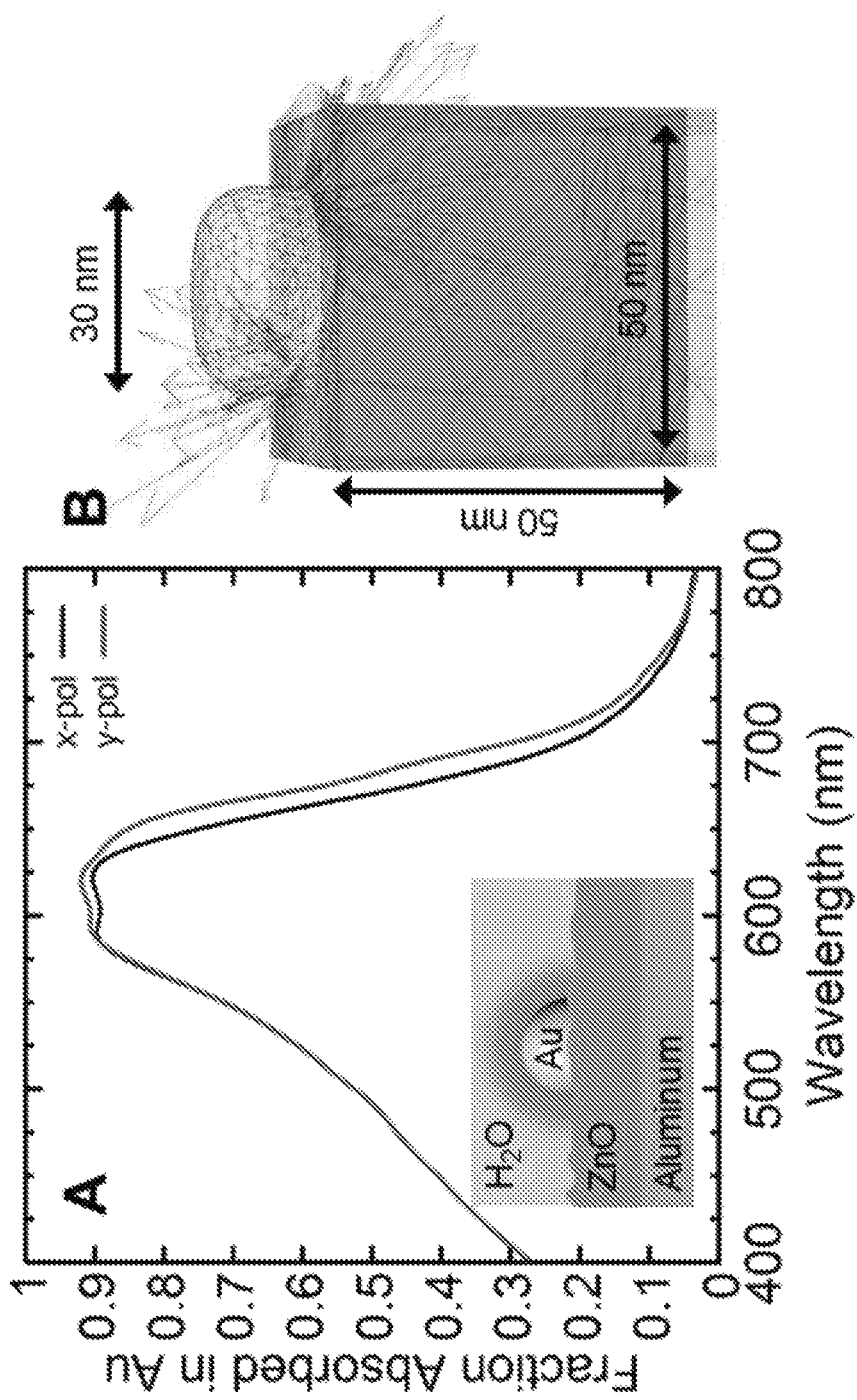
FIG. 4A is a plot of a calculated fraction of incident polarized light (polarized in x and y directions) absorbed by 30 nm gold (Au) nanoparticles deposited on a 50 nm ZnO/Al stack with approximately 15 nm spacing between the Au particles, according to an embodiment of the present disclosure.
FIG. 4B shows a simulation of an electric field strength at the Au/ZnO interface with 620 nm y-polarized light, according to an embodiment of the present disclosure.

FIG. 4A is a plot of a calculated fraction of incident polarized light (polarized in x and y directions) absorbed by 30 nm gold (Au) nanoparticles deposited on a 50 nm ZnO/Al stack, according to an embodiment of the present disclosure. As shown in FIG. 4A, over 90% of the incident light is calculated to be absorbed in the Au nanoparticle at a wavelength in the visible region of about ~600 nm, and the structure is polarization independent. Polarization independence can maximize the absorption of randomly polarized sunlight.

FIG. 4B shows a simulation of an electric field strength at the Au/ZnO interface with 620 nm y-polarized light, according to an embodiment of the present disclosure. As shown in FIG. 4B, strong electric field vectors are present in the XY plane at the Au/ZnO interface for the MSM device excited at 620 nm visible wavelength. Strong localized electromagnetic fields at the metal-semiconductor interface can provide improved hot-electron transfer efficiency to the semiconductor through the PICTT mechanism. The Al back reflector 14 can play a role in enhancing the absorption in the gold Au nanoparticles 18.

Figure 5:
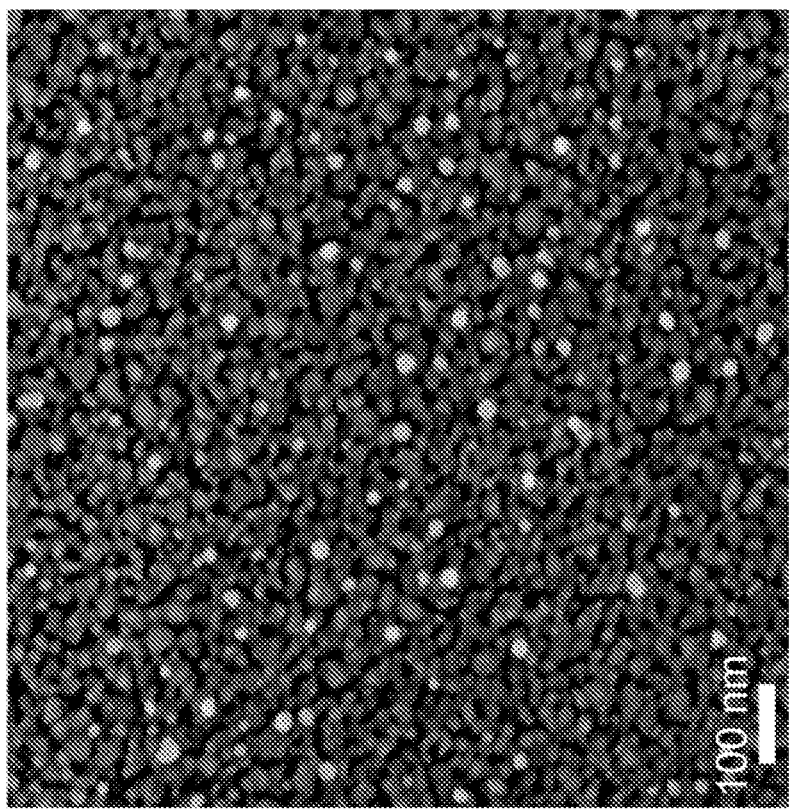
FIG. 5 is a scanning electron microscope field image showing Au nanoparticles on a ZnO layer, according to an embodiment of the present disclosure.

FIG. 5 is a scanning electron microscope image showing the nanoparticles 18 on a ZnO layer, according to an embodiment of the present disclosure.

In an embodiment, the device 10 is placed in the bottom of a photoreactor which consisted of an open beaker with 30 mL of DI water. The photoreactor is exposed to air and agitated with an orbital mixer. The photoreactor is illuminated from above by a Wavelabs LED-based class AAA+ solar simulator which allows spectral tunability from 365 nm to 1100 nm. AM1.5G global standard light spectrum cut to 400-1100 nm is used to avoid UV exposure and heating. Amplex red-horseradish peroxidase is used to characterize the concentration of $H_2O_2$ from aliquots from the photoreactor. Amplex red selectively reacts with $H_2O_2$ to create the highly fluorescent dye resorufin in a 1:1 ratio with $H_2O_2$. The concentration of $H_2O_2$ can thus be determined using fluorescence spectroscopy and a plot of known $H_2O_2$ concentration vs. resorufin emission. Aliquots are periodically taken from the outflow and mixed with amplex red-horseradish peroxidase. Amplex red-horseradish peroxidase is kept chilled and in the dark before use. Immediately after mixing the aliquot from the photoreactor with amplex red-horseradish peroxidase, its resurfurin content is measured using a PTI fluorometer with the excitation monochromator set at 570 nm and the emission monochromator sweeping from a wavelength range from 580 nm to 620 nm. A linear standard curve calculated from known $H_2O_2$ concentrations and measured resurfurin emission is used to convert the measured resurfurin emission in the aliquot to a concentration of $H_2O_2$.

Figure 6:
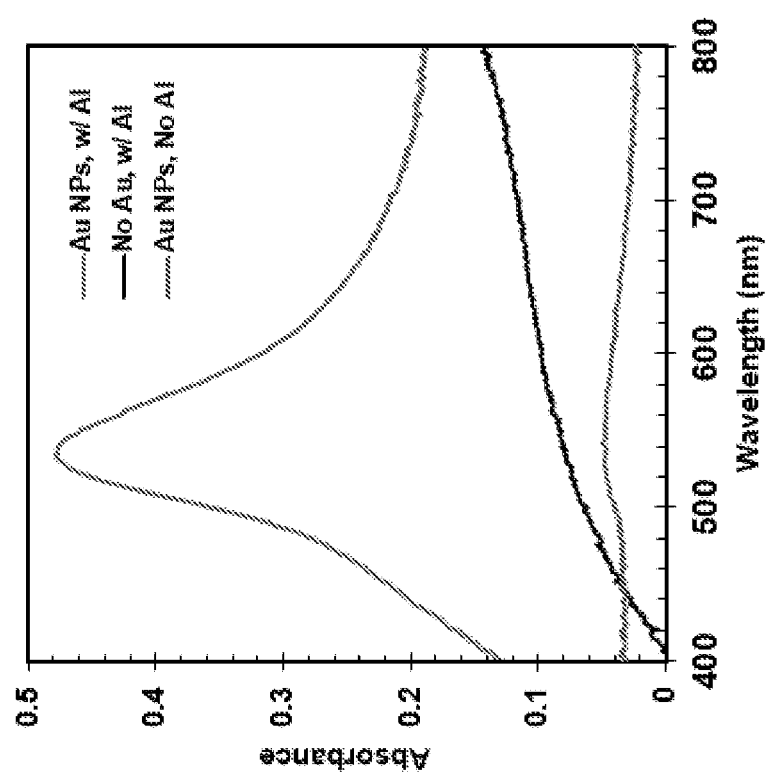
FIG. 6 shows plot of the measured absorption from Au nanoparticles on a 50 nm ZnO/Al stack (upper curve), a 50 nm ZnO/Al stack (medium curve) and Au nanoparticle on a 50 nm ZnO/glass stack (lowest curve).

FIG. 6 shows absorption spectra from Au nanoparticles on a 50 nm ZnO/Al stack (red), Au nanoparticles on 50 nm ZnO/glass stack (blue), and a 50 nm ZnO film on Al (black). Note the significant increase in the absorption in the film when the Al reflector is added.

Figures 7A, 7B:
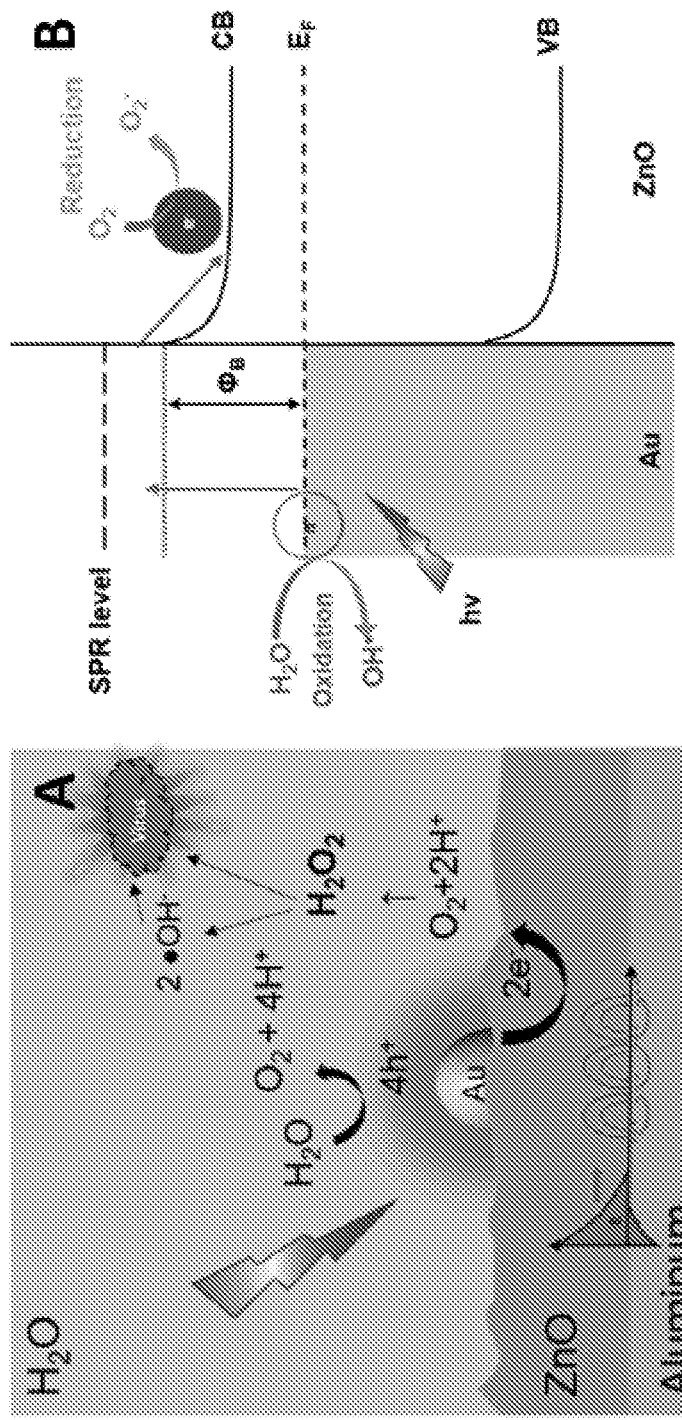
FIG. 7A is a diagram showing a possible process or mechanism of hot carrier generation leading to in situ ROS production, according to an embodiment of the present disclosure.
FIG. 7B is an energy band diagram showing the Au—ZnO junction, the Shottky barrier height ($\varphi_B$), and energy positions for the oxidation and reduction reactions from corresponding hot holes and electrons.

FIG. 7A is a diagram showing the proposed process or mechanism of hot carrier generation leading to in situ ROS production, according to an embodiment of the present disclosure.

FIG. 7B is an energy band diagram showing the Au—ZnO junction, the Shottky barrier height ($\varphi_B$), and the energy positions for the oxidation and reduction reactions from the corresponding hot holes and electrons.

The combination of strong absorption with effective charge separation provides efficient in situ $H_2O_2$ production. In addition, in situ, ROS can efficiently inactivate waterborne pathogens given the long-range diffusion and high oxidation potential of $H_2O_2$.

For example, in embodiments of the device according to the present disclosure, in situ generation of short-lived superoxide radical anion ($O_2\bullet^-$) and long-lived $H_2O_2$ can result in relatively high inactivation efficiencies (on a photon basis) of waterborne pathogens. This can be accomplished without any use of ultraviolet light and semiconductor photo-catalyst disinfection routes. The present device 10 utilizes the unique physics offered by strongly coupled plasmonic-semiconductor materials to provide efficient charge separation and excellent light absorption. The device 10 enables efficient inactivation of waterborne pathogens with visible-light. Therefore, this device can be used in water disinfection processes. Photo-disinfection of water offers a low cost, widely accessible means for purifying water but current photo-disinfection methods (e.g. SODIS) primarily rely on the ultraviolet portion of the solar spectrum for inactivation of pathogens. Ultraviolet light makes up only 5% of this energy whereas approximately 40% is the visible light of wavelengths between 400 nm-700 nm. Therefore, traditional photo-disinfection of waterborne pathogens using only ultraviolet light vastly underutilizes the full capability of solar radiation to perform chemical oxidation reactions for water purification.

Harnessing visible light for the photo-disinfection of water can drastically improve the efficiency of waterborne pathogen inactivation without the potentially harmful byproducts of chlorine disinfection. The high efficiency of plasmonic photo-disinfection could both reduce the treatment time and improve the overall quality of water throughout the world, especially in remote areas where access to electrical power is scarce. Therefore, the outcomes are not only expected to advance the field of plasmonic-assisted photochemistry but also make broad and highly positive societal impact.

Figure 8:
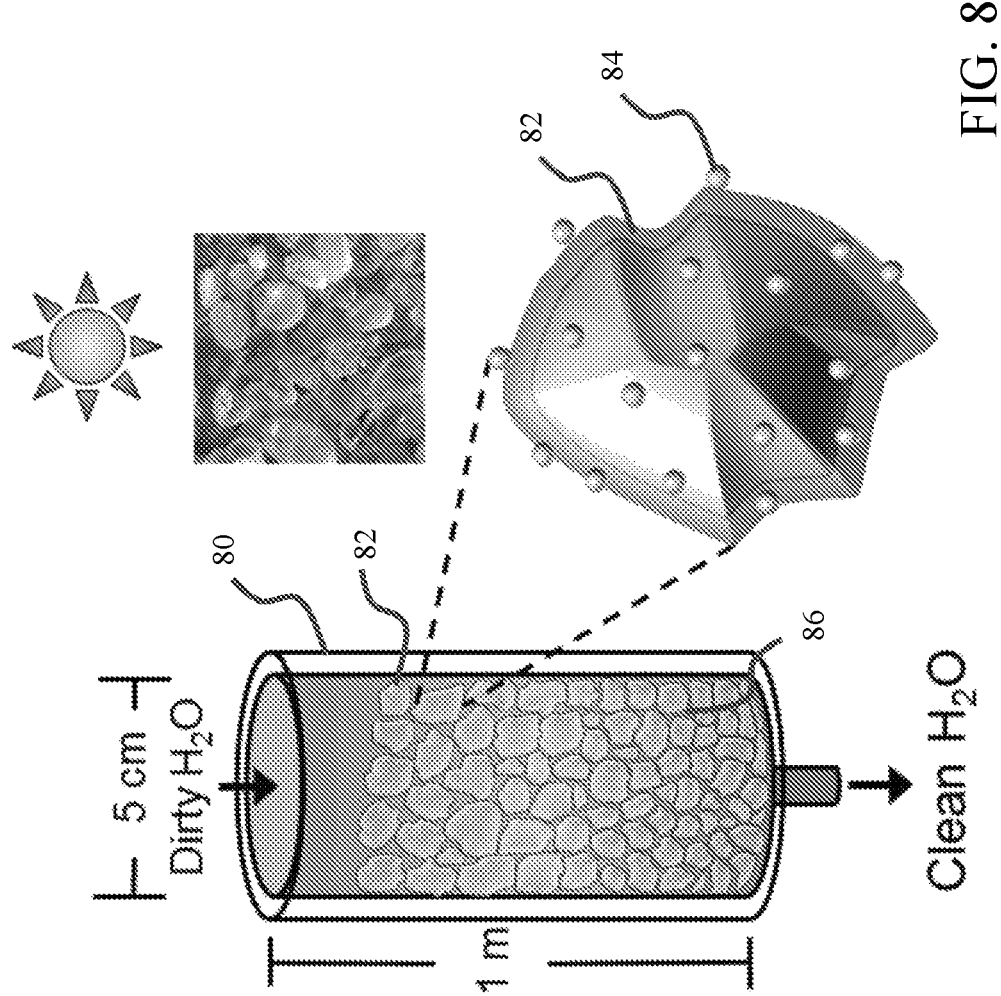
FIG. 8 is a diagram of a configuration for continuous flow plasmonic-photocatalytic column for water disinfection, according to an embodiment of the present disclosure.

FIG. 8 is a diagram of a configuration for continuous flow plasmonic-photocatalytic column for water disinfection, according to an embodiment of the present disclosure. In an embodiment, larger scale reactors which maintain high surface-to-volume ratios can be used thus enabling scalable implementation of the device described herein. For example, a continuous flow, high surface-to-volume photoreactor including a tube 80 (made of plastic such as PET, or glass)

packed with metal-oxide-coated glass sand 82 decorated with Au nanoparticles 84 can be used. The pores 86 between the sand grains offer short transport lengths for efficient disinfection by ROS. This configuration can provide a scalable economic solution. In an exemplary embodiment, a 5 cm diameter, 1 m long tube packed with 1.5 mm diameter ZnO-coated glass sand decorated with 20 nm Au particles spaced 100 nm apart can be implemented. Gravity driven flow rate through this reactor tilted at 30 degrees is calculated to be about 0.2 gals/min with a residence time of 1 min. Other potential reactor designs are flat plate type reactors which would allow more complex plasmonic structures while maintaining scalability and high-surface-to-volume ratio. Most importantly, preliminary economic calculations show that despite the high intrinsic cost of Au, the small amount used in these reactors keep the total system cost quite low.

Fabricating high-quality plasmonic nanostructures can be costly and time-consuming. To minimize unnecessary fabrication work, rigorous full-field electromagnetic simulations are implemented using the Maxwell equation solver JCMsuite to calculate the optical properties of the MSM-plasmonic devices (absorbers). Simulations can sweep the entire geometry space varying the diameter of the Au nanoparticle from 5-100 nm and the ZnO thickness from 10-100 nm. Furthermore, the spacing between Au nanoparticles can be explored with both periodic and isolated structures being calculated. Various MSM absorber geometries can be characterized by the following criteria: (1) broadband absorption of visible light in the Au nanoparticle and, (2) the enhancement of the electric field strength at the Au/ZnO interface. Utilizing results obtained from such stimulations, parameters can be suitably optimized by persons skilled in the art. An ideal structure can have near complete absorption in the visible wavelength range from 400-900 nm, be polarization independent and exhibit several orders of magnitude electric field enhancement at the Au/ZnO interface.

As described above, in an embodiment, the substrate 12 of the device 10 can be glass chips cut to, for example, 25 mm×25 mm will be used as the for support. However, glass can be replaced with a lower cost plastic support. In addition, with respect to the metal layer 14, aluminum can be used as back reflectors. The aluminum can be deposited by rapid thermal evaporation to minimize oxidation during growth and maximize the plasmonic properties of the aluminum. Spin coating can be used to deposit a ZnO sol-gel to the Al back reflector followed by annealing in a tube furnace. Au nanoparticles can then be deposited on the ZnO by either gold photo-deposition from a gold salt or evaporation through a colloidal lithographic mask. Photo-deposition has the advantages of ease of implementation and ready scalability. However, colloidal mask lithography can also be used and further enables exploring the effect of pitch, particle shape (e.g. round vs. triangular), particle size over the full 25 mm×25 mm MSM absorber area without using expensive cleanroom nanofabrication equipment and particle embedding depth. Colloidal mask lithography provides a readily accessible system for optimization of particle parameters.

In addition, in an embodiment, HCl etching of the ZnO surface with varying concentrations and times can be used to achieve tailored ZnO surface roughnesses. These roughened ZnO films can then be processed as normal with subsequent Au deposition and photo-deposition. In an embodiment, doping the ZnO with, for example, Al, Ga, F and/or Mg can be used as a method to improve chemical resistance, if the ZnO surface is degraded during $H_2O_2$ production. Various methods can be used to dope ZnO with dopants such as Al, Ga, F and/or Mg, for example via ion beam sputtering, ion beam deposition or plasma doping. In the crystal ZnO lattice, the oxygen atom is replaced at various locations in the lattice by the dopant. Doping can be characterized by inductively coupled plasma optical emission spectrometry (ICP-OES) and energy dispersive spectroscopy. Doping can also be used to adjust the band positions of the oxide to facilitate carrier injection.

Figure 9:
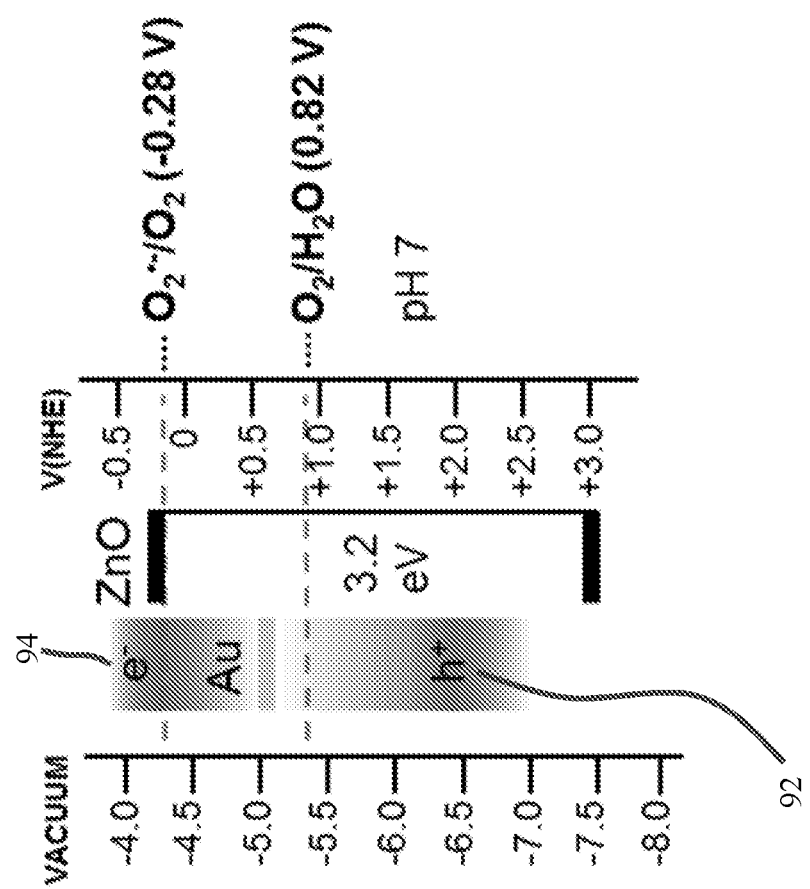
FIG. 9 is diagram of energies for gold, ZnO and relevant re-dox couples with respect to vacuum and the normal hydrogen electrode at pH 7, according to an embodiment of the present disclosure.

FIG. 9 is diagram of energies for gold (Au), zinc oxide (ZnO) and relevant re-dox couples with respect to vacuum and the normal hydrogen electrode at pH 7, according to an embodiment of the present disclosure. The energy distribution for the hot electrons 94 and hot holes 92 is shown in FIG. 9. Hot holes 92 on the Au nanoparticles can oxidize water and the hot electrons 94 injected into the ZnO can reduce dissolved $O_2$ to form $O_2\bullet^-$ which proceeds to form $H_2O_2$. FIG. 9 shows the Au work function, energy distribution for the hot holes 92 and hot electrons 94 and the band positions for ZnO with respect to the relevant oxygen redox couples at pH 7. As illustrated in FIG. 9, the energy in hot carriers generated from Au is not evenly distributed, with hot holes 92 being higher in energy than hot electrons 94. Some of the Au hot electrons 94 can overcome the Schottky barrier at the ZnO interface and proceed to reduce $O_2$ to $O_2\bullet^-$. Superoxide will then be converted into $H_2O_2$, as shown in FIG. 7D. Hot holes 92 on the Au nanoparticles have ample energy to oxidize water by regaining the electron they injected into the ZnO.

The rate of $H_2O_2$ produced in the 30 mL photoreactor can be quantified using narrowband light swept across the visible spectrum (e.g. a photo-action spectrum). The Wavelabs LED-based solar simulator is capable of providing wavelength dependent large area illumination through its 20 different LED sources. Photoaction spectrum for the production of $H_2O_2$ can be measured for the MSM absorbers/devices 10 fabricated. A Perkin-Elmer spectrophotometer, for example, can be used to measure the extinction spectra for the MSM absorber 10, which can be compared with the calculated far field extinction spectra. Using these analyses, a direct correlation may be established between the absorption in the Au nanoparticles and the wavelength dependent production of $H_2O_2$. Photoaction spectrums can be used in understanding the role the LSPR has on the hot-carrier generation and ultimately the in situ $H_2O_2$ production mechanism. Although the present invention is not limited by theory, mechanism or mode of action, to further confirm that in situ $H_2O_2$ generation is driven by hot carriers a series of control experiments can be run:

1. Oxygen control: $O_2$ can be degassed from the inlet water via He sparging. Degassed water is expected to result in negligible in situ production of $H_2O_2$.

2. Oxide coating on Au Nanoparticles: Atomic layer deposition (ALD) can be used to coat the dewetted Au nanoparticles with a thin (5-10 nm) $SiO_2$ layer. The oxide coating can block the hot hole from oxidizing the water, stopping the in situ production of $H_2O_2$.

3. Oxide coating between Au nanoparticles and ZnO: A thin $SiO_2$ layer can be grown by ALD on the ZnO before the Au evaporation and dewetting. This $SiO_2$ layer can block hot electron transfer from the Au nanoparticles to the ZnO, also stopping the in situ generation of $H_2O_2$.

4. No Al back reflector: Absorbers with Au/ZnO grown directly on glass templates can also be fabricated, as shown in FIG. 6 (the lowest curve).

Figure 10:
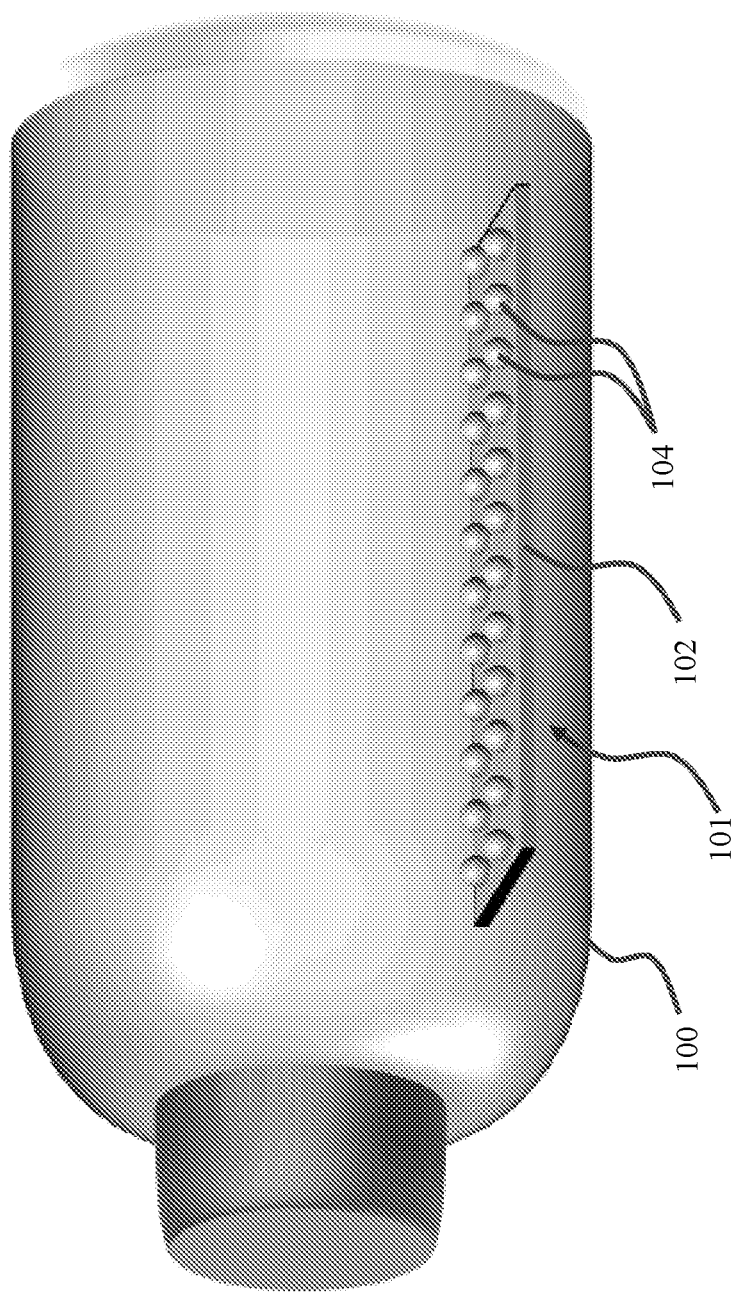
FIG. 10 is a diagram of a configuration for a plasmonic-photocatalytic for water disinfection in a closed-container (e.g., a bottle), according to another embodiment of the present disclosure.

FIG. 10 is a diagram of a configuration for a plasmonic-photocatalytic for water disinfection in a closed-container (e.g., a bottle), according to another embodiment of the present disclosure. In an embodiment, a closed-container (e.g., a glass or plastic bottle such as a PET bottle) 100 can be provided with an MSM device 101. The MSM device 101 can be inserted into the container 100. The MSM device 101 is similar to the MSM device shown in FIG. 3. The MSM device 101 comprises a substrate (e.g., silicon, glass, polyimide), a metal layer (e.g., Al, Cu, Au or Ag layer), and an oxide layer (e.g., ZnO, $WO_3$, $TiO_2$, $SrTiO_3$, $SnO_2$, or $BiVO_4$ layer) referred to as whole as layer 102. The device 101 also includes nanoparticles (e.g., Au nanoparticles or Au-alloy nanoparticles such as Au:Cu or Au:Ag) 104 deposited on layer 102. Although one MSM device 101 is shown in FIG. 10 as being provided inside the closed container (e.g., bottle) 100, as it must be appreciated a plurality of MSM devices 101 can be provided inside the closed-container (e.g., bottle) 100. In an embodiment, the closed-container 100 can be filled with contaminated water and can be exposed to light. The exposure of the MSM devices 101 to light (e.g., visible light) decontaminates the water inside the container 100.

Figure 11:
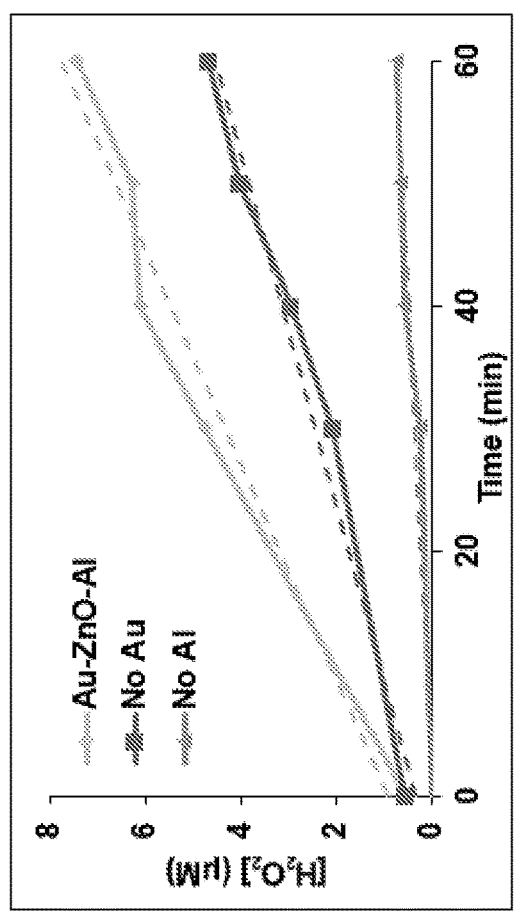
FIG. 11 is a plot of the production of hydrogen peroxide $H_2O_2$ versus time in a gold-zinc oxide-Aluminum system wherein gold or gold-alloy nanoparticles are deposited on a zinc oxide layer on top of an aluminum layer, according to an embodiment of the present disclosure.

FIG. 11 is a plot of the production of hydrogen peroxide $H_2O_2$ versus time in a gold-zinc oxide-Aluminum system wherein gold or gold-alloy nanoparticles are deposited on a zinc oxide layer on top of an aluminum layer, according to an embodiment of the present disclosure. The uppermost line in the plot labeled "Au—ZnO—Al" corresponds to the system gold-zinc oxide-Aluminum and shows that the concentration (μM) of hydrogen peroxide $H_2O_2$ generation increases of time (min). The hydrogen peroxide $H_2O_2$ production reaches about 8 μM after 60 minutes exposure to light. The concentration of hydrogen peroxide $H_2O_2$ production is about $3.5.10^-$ μM. The middle line labeled "No-Au" corresponds a control system where gold is not deposited on a zinc oxide layer on top of the aluminum layer. The line labeled "No Au" also shows that the concentration (nM) of hydrogen peroxide $H_2O_2$ generation increases of time (min) but at a lower rate than in the gold-zinc oxide-aluminum system. Similarly, the lower line labeled "No-Al" corresponds a control system where aluminum is not used as a metal layer. The line labeled "No Al" also shows that the concentration (μM) of hydrogen peroxide $H_2O_2$ generation increases with time (min) but at a much lower rate than in the gold-zinc oxide-aluminum system.

Figure 12:
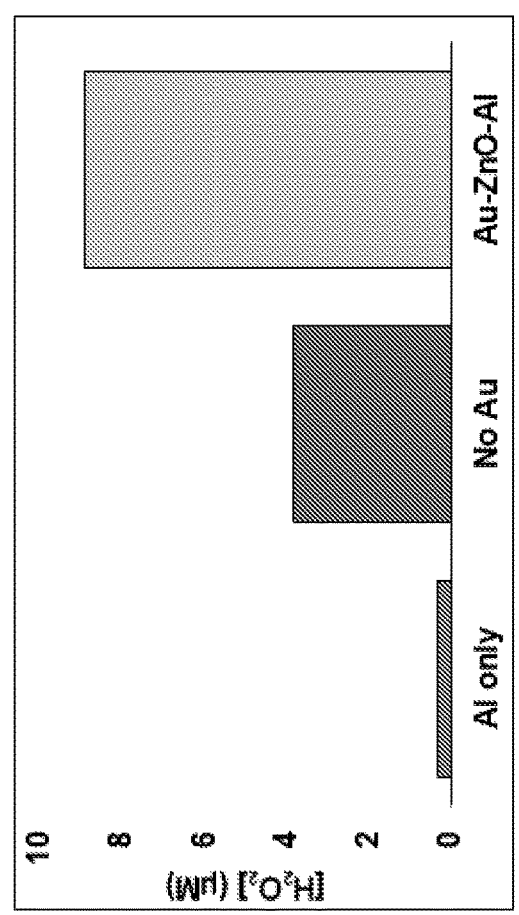
FIG. 12 is a bar-graph showing a comparison between the concentration of hydrogen peroxide $H_2O_2$ obtained with the three systems, i.e., with only aluminum, with no gold, and gold-zinc oxide-aluminum, respectively, according to an embodiment of the present disclosure.
Figure 14:
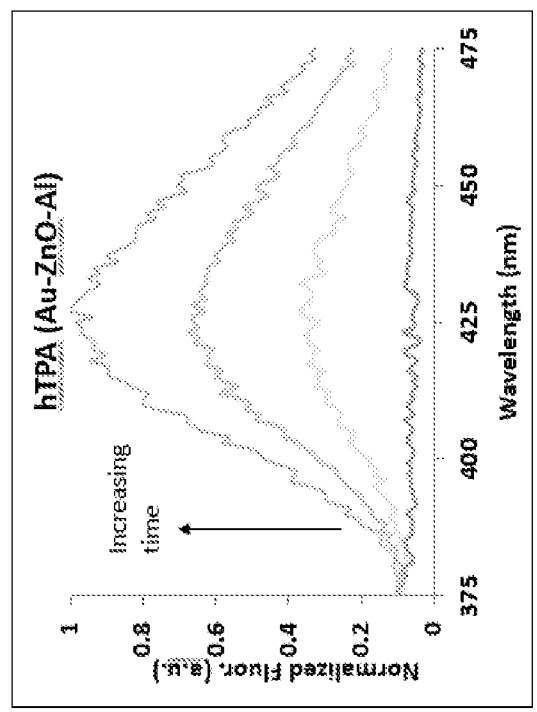
FIG. 14 is a plot showing a variation of a normalized fluorescence signal of hTPA antibodies in contact with Au—ZnO—Al metal-semiconductor-metal (MSM) plasmonic device versus the wavelength (nm) of light irradiating the antibodies, according to an embodiment of the present disclosure.

FIG. 12 is a bar-graph showing a comparison between the concentration of hydrogen peroxide $H_2O_2$ obtained with the three systems, i.e., with only aluminum, with no gold, and gold-zinc oxide-aluminum, respectively, according to an embodiment of the present disclosure. As shown in FIG. 14, the amount or concentration of hydrogen peroxide $H_2O_2$ generated by the Au—ZnO—Al system (about 10 μM) is higher than the amount of hydrogen peroxide $H_2O_2$ generated by the "No Au" system, i.e., a system not using gold particles (about 4 μM) and higher than the amount of hydrogen peroxide $H_2O_2$ generated by the "Al only" system, i.e., a system with aluminum only (less than 0.5 μM).

Figure 13:
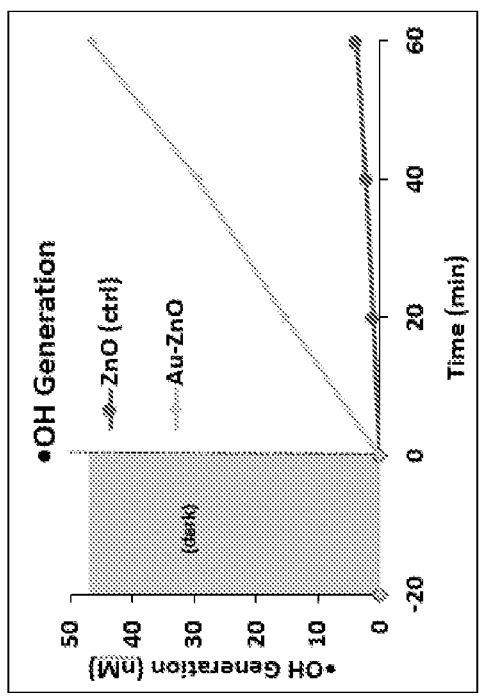
FIG. 13 is a plot of the production of radical ●OH versus time in a gold-zinc oxide system wherein gold or gold-alloy nanoparticles are deposited on a zinc oxide layer, according to an embodiment of the present disclosure.

FIG. 13 is a plot of the production of radical ●OH versus time in a gold-zinc oxide system wherein gold or gold-alloy nanoparticles are deposited on a zinc oxide layer, according to an embodiment of the present disclosure. The line in the plot labeled "Au—ZnO" corresponds to the system gold-zinc oxide and shows that the concentration (nM) of radical ●OH generation increases with time (min). The radical ●OH production reaches 50 nM after 60 minutes exposure to light. The concentration of ●OH of $3.5.10^{-10}$ μM. The line labeled "ZnO" corresponds a control system where gold is not deposited on a zinc oxide layer. The line labeled "ZnO" also shows that the concentration (nM) of radical ●OH generation increases of time (min) but at a lower rate than in the gold-zinc oxide system.

FIG. 14 is a plot showing a variation of a normalized fluorescence signal of hTPA antibodies in contact with Au—ZnO—Al metal-semiconductor-metal (MSM) plasmonic device versus the wavelength (nm) of light irradiating the antibodies, according to an embodiment of the present disclosure. As shown in FIG. 12, the normalized fluorescence signal increases with irradiation of hTPA (Au—ZnO—Al) with light. The maximum of the fluorescence signal occurs at about a light wavelength of about 425 nm.

Figure 15:
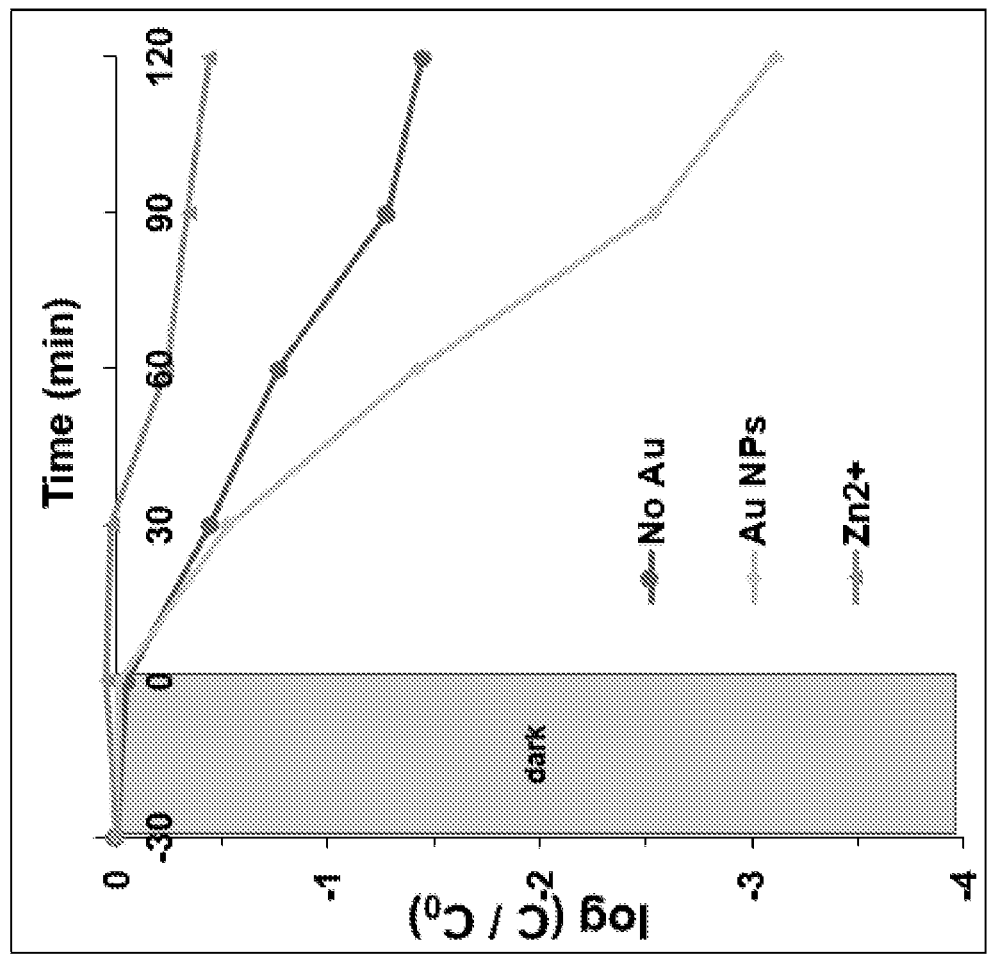
FIG. 15 is a plot of disinfection rate expressed as the logarithm of the resulting amount of bacteria divided by the initial amount of bacteria versus time in a system with gold nanoparticles "Au NPs", a system without gold nanoparticles "No Au" and a system with zinc oxide "Zn2+", according to embodiments of the present disclosure.

FIG. 15 is a plot of disinfection rate expressed as the logarithm of the resulting amount of bacteria divided by the initial amount of bacteria versus time in a system with gold nanoparticles "Au NPs", a system without gold nanoparticles "No Au" and a system with zinc oxide "$Zn^{2+}$", according to embodiments of the present disclosure. The lower line in the plot labeled "Au NPs" corresponds to the system gold-zinc oxide-Aluminum and shows that the concentration log (C/Co) (resulting amount of bacteria divided by the initial amount of bacteria) decreases with time (min). The middle line labeled "No Au" corresponds a control system where gold is not deposited on a zinc oxide layer on top of the aluminum layer. The line labeled "No Au" also shows that the concentration log (C/Co) (resulting amount of bacteria divided by the initial amount of bacteria) decreases with time (min) but at a lower rate than in the gold-zinc oxide-aluminum system. Similarly, the line uppermost labeled "$Zn^{2+}$" corresponds a control system where Zinc oxide is used alone. The line labeled "$Zn^{2+}$" also shows that the concentration log (C/Co) (resulting amount of bacteria divided by the initial amount of bacteria) decreases with time (min) but at a much lower rate than in the gold-zinc oxide-aluminum system. The system with gold nanoparticles "Au NPs", (e.g., the system Au—ZnO—Al) achieves a disinfection rate of 99.95% in about two hours with visible and infrared irradiation in the wavelength range between 400 nm and 1100 nm.

Figure 16:
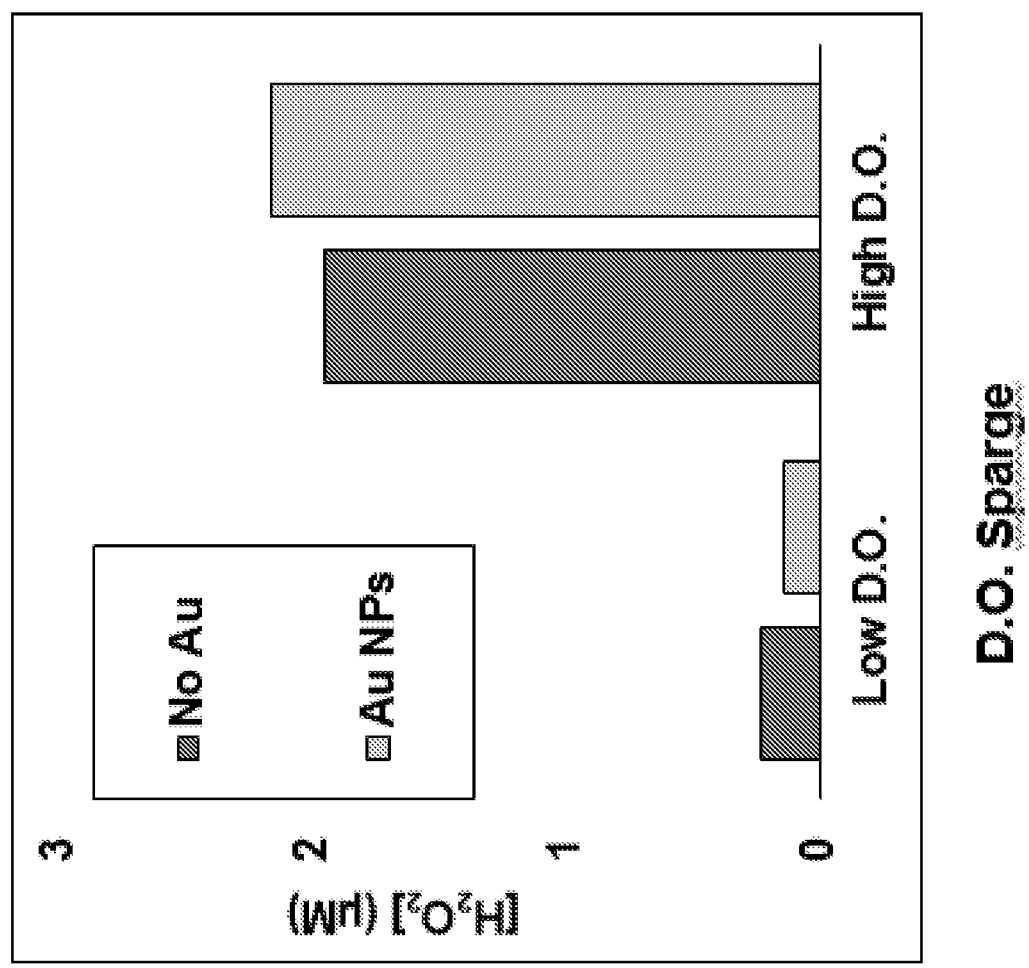
FIG. 16 is a bar-graph of the concentration ($\mu$M) of hydrogen peroxide $H_2O_2$ as a function of level of dissolved oxygen (DO) in a system with "No Au" and a system with "Au NPs" when irradiated with light in the visible and infrared ranges, according to an embodiment of the present disclosure.

FIG. 16 is a bar-graph of the concentration (μM) of hydrogen peroxide $H_2O_2$ as a function of level of dissolved oxygen (DO) in a system with "No Au" and a system with "Au NPs" when irradiated with light in the visible and infrared ranges, according to an embodiment of the present disclosure. As shown in FIG. 16, at low DO, the concentration of hydrogen peroxide $H_2O_2$ obtained with "No Au" is higher than the concentration of hydrogen peroxide $H_2O_2$ obtained with "Au NPs." However, when at higher DO, the concentration of hydrogen peroxide $H_2O_2$ obtained with "No Au" is lower than the concentration of hydrogen peroxide $H_2O_2$ obtained with "Au NPs." Therefore, without DO, ROS generation does not occur. However, with the presence of DO, ROS generation occurs.

Figure 17:
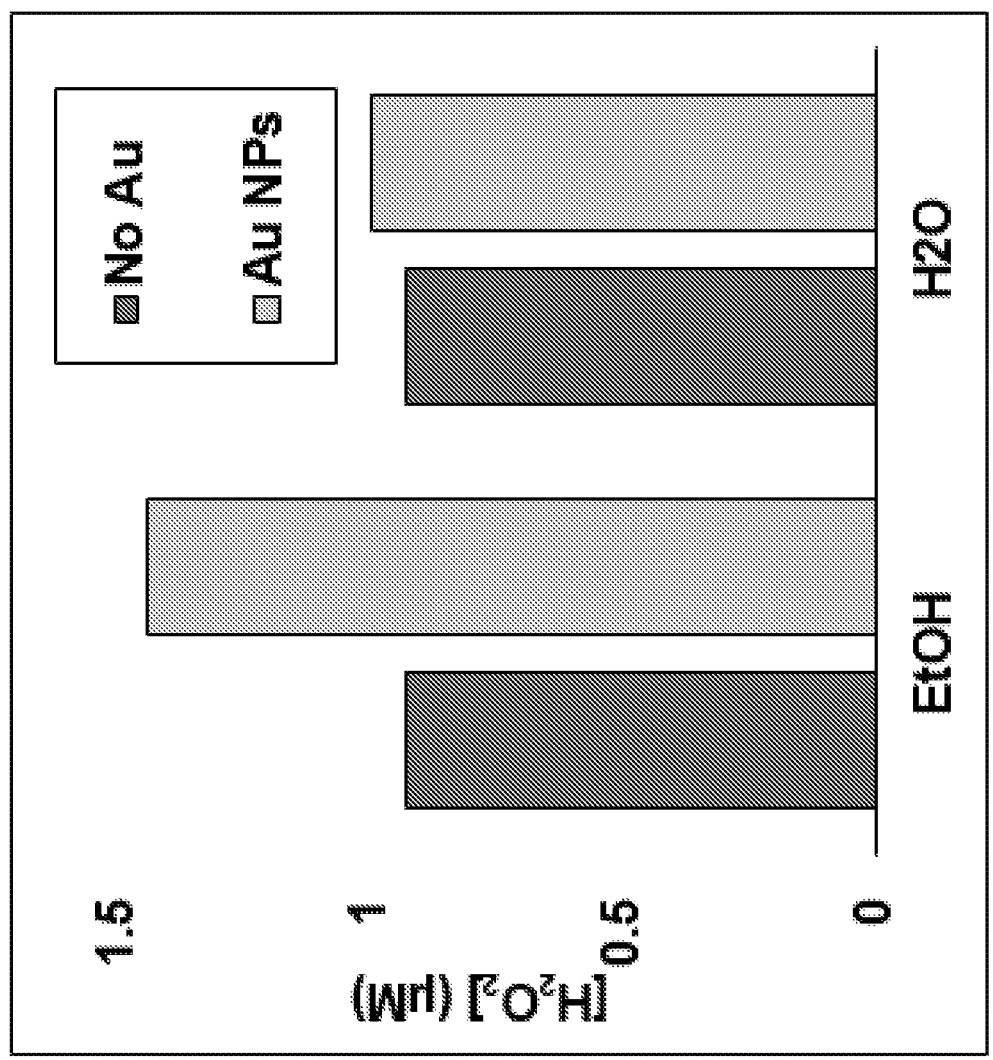
FIG. 17 is a bar-graph of the concentration ($\mu$M) of hydrogen peroxide $H_2O_2$ as a function of using Ethanol (EtOH) and water ($H_2O$) in a system with "No Au" and a system with "Au NPs" when irradiated with light in the visible and infrared ranges, according to an embodiment of the present disclosure.

FIG. 17 is a bar-graph of the concentration (μM) of hydrogen peroxide $H_2O_2$ as a function of using Ethanol (EtOH) and water ($H_2O$) in a system with "No Au" and a system with "Au NPs" when irradiated with light in the visible and infrared ranges, according to an embodiment of the present disclosure. As shown in FIG. 17, for EtOH, the concentration of hydrogen peroxide $H_2O_2$ obtained with "No Au" is much lower than the concentration of hydrogen peroxide $H_2O_2$ obtained with "Au NPs." When using water, the concentration of hydrogen peroxide $H_2O_2$ obtained with "No Au" and the concentration of hydrogen peroxide $H_2O_2$ obtained with "Au NPs" are about the same. This can be interpreted as ethanol dissolved in DI water acts as an electron donor (hole scavenger) to replace the hot-electron used for ROS generation.

Figure 18:
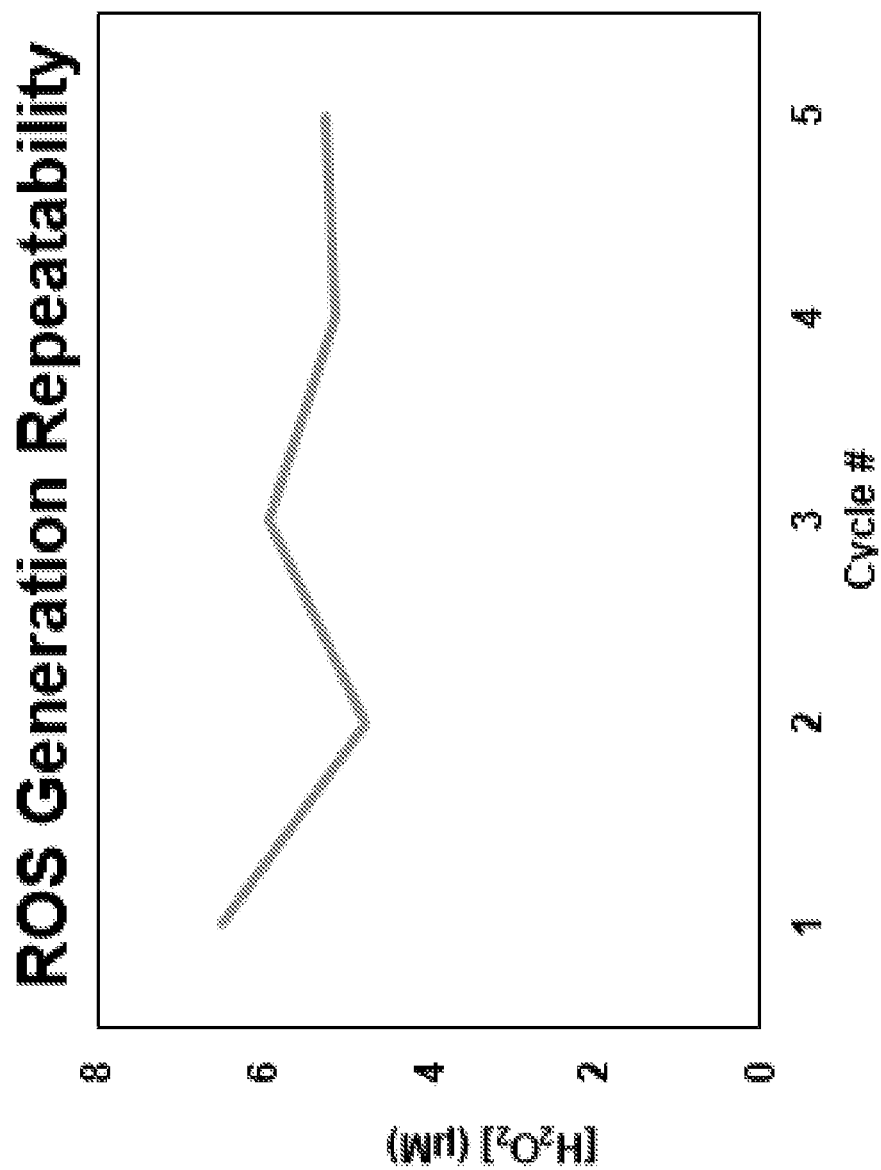
FIG. 18 is plot of a concentration ($\mu$M) of hydrogen peroxide $H_2O_2$ produced with a system with "Au NPs" as a function of cycle of repeatability when irradiated with light in the visible and infrared ranges, according to an embodiment of the present disclosure.

FIG. 18 is plot of a concentration (μM) of hydrogen peroxide $H_2O_2$ produced with a system with "Au NPs" as a function of cycle of repeatability when irradiated with light in the visible and infrared ranges, according to an embodiment of the present disclosure. Each cycle is a period of about 30 minutes. The device or system has minimal degradation over time/cycles with 0.5 ppm (per mass) $Zn^{2+}$ in 60 minutes and no detectable leeching of aluminum or gold (less than 1 ppb). The elemental species present in reaction effluent (Zn and Al) are measured by inductively coupled plasma optical emission spectrometry (ICP-OES).

REFERENCES

1). Shiraishi, Y.; Kanazawa, S.; Kofuji, Y.; Sakamoto, H.; Ichikawa, S.; Tanaka, S.; Hirai, T. Sunlight-Driven Hydrogen Peroxide Production from Water and Molecular Oxygen by Metal-Free Photocatalysts. *Angewandte Chemie* 2014, 126, (49), 13672-13677.
2). Zhou, L.; Tan, Y.; Ji, D.; Zhu, B.; Zhang, P.; Xu, J.; Gan, Q.; Yu, Z.; Zhu, J. Self-assembly of highly efficient, broadband plasmonic absorbers for solar steam generation. *Science advances* 2016, 2, (4), e1501227.
3). Liu, C.; Kong, D.; Hsu, P.-C.; Yuan, H.; Lee, H.-W.; Liu, Y.; Wang, H.; Wang, S.; Yan, K.; Lin, D. Rapid water disinfection using vertically aligned MoS2 nanofilms and visible light. *Nature Nanotechnolog* 2016.
4). Giugni, A.; Torre, B.; Toma, A.; Francardi, M.; Malerba, M.; Alabastri, A.; Zaccaria, R. P.; Stockman, M. I.; Di Fabrizio, E. Hot-electron nanoscopy using adiabatic compression of surface plasmons. *Nature nanotechnology* 2013, 8, (11), 845-852.
5). Shiraishi, Y.; Kanazawa, S.; Sugano, Y.; Tsukamoto, D.; Sakamoto, H.; Ichikawa, S.; Hirai, T. Highly selective production of hydrogen peroxide on graphitic carbon nitride (g-C3N4) photocatalyst activated by visible light. *Acs Catalysis* 2014, 4, (3), 774-780.
6). Cooper, W. J.; Lean, D. R. S. Hydrogen-Peroxide Concentration in a Northern Lake—Photochemical Formation and Diel Variability. *Environmental Science & Technology* 1989, 23, (11), 1425-1428.
7). Asghar, A.; Abdul Raman, A. A.; Wan Daud, W. M. A. Advanced oxidation processes for in-situ production of hydrogen peroxide/hydroxyl radical for textile wastewater treatment: a review. *Journal of Cleaner Production* 2015, 87, 826-838.
8). Keane, D. A.; McGuigan, K. G.; Ibanez, P. F.; Polo-Lopez, M. I.; Byrne, J. A.; Dunlop, P. S. M.; O'Shea, K.; Dionysiou, D. D.; Pillai, S. C. Solar photocatalysis for water disinfection: materials and reactor design. *Catalysis Science & Technology* 2014, 4, (5), 1211-1226.
9). Ogilby, P. R. Singlet oxygen: there is indeed something new under the sun. *Chemical Society reviews* 2010, 39, (8), 3181-209.
10). Okuda, M.; Tsuruta, T.; Katayama, K. Lifetime and diffusion coefficient of active oxygen species generated in TiO2 sol solutions. *Phys. Chem. Chem. Phys.* 2009, 11, (13), 2287-2292.
11). McPeak, K. M.; Jayanti, S. V.; Kress, S. J. P.; Meyer, S.; Iotti, S.; Rossinelli, A.; Norris, D. J. Plasmonic Films Can Easily Be Better: Rules and Recipes. *ACS Photonics* 2015, 2, (3), 326-333.
12). McPeak, K. M.; van Engers, C. D.; Blome, M.; Park, J. H.; Burger, S.; Gosálvez, M. A.; Faridi, A.; Ries, Y. R.; Sahu, A.; Norris, D. J. Complex Chiral Colloids and Surfaces via High-Index Off-Cut Silicon. *Nano Letters* 2014, 14, (5), 2934-2940.
13). McPeak, K. M.; van Engers, C. D.; Bianchi, S.; Rossinelli, A.; Poulikakos, L. V.; Bernard, L.; Herrmann, S.; Kim, D. K.; Burger, S.; Blome, M.; Jayanti, S. V.; Norris, D. J. Ultraviolet Plasmonic Chirality from Colloidal Aluminum Nanoparticles Exhibiting Charge-Selective Protein Detection. *Advanced Materials* 2015, 27, (40), 6244-6250.
14). Park, J. H.; Nagpal, P.; McPeak, K. M.; Lindquist, N. C.; On, S.-H.; Norris, D. J. Fabrication of Smooth Patterned Structures of Refractory Metals, Semiconductors, and Oxides via Template Stripping. *ACS Applied Materials & Interfaces* 2013, 5, (19), 9701-9708.
15). Lindquist, N. C.; Nagpal, P.; McPeak, K. M.; Norris, D. J.; On, S.-H. Engineering metallic nanostructures for plasmonics and nanophotonics. Reports on Progress in Physics. *Physical Society (Great Britain)* 2012, 75, (3), 036501-036501.
16). Kress, S. J. P.; Antolinez, F. V.; Richner, P.; Jayanti, S. V.; Kim, D. K.; Prins, F.; Riedinger, A.; Fischer, M. P. C.; Meyer, S.; McPeak, K. M.; Poulikakos, D.; Norris, D. J. Wedge Waveguides and Resonators for Quantum Plasmonics. *Nano Letters* 2015, 15, (9), 6267-6275.
17). McPeak, K. M.; Le, T. P.; Britton, N. G.; Nickolov, Z. S.; Elabd, Y. A.; Baxter, J. B. Chemical Bath 17. Deposition of ZnO Nanowires at Near-Neutral pH Conditions without Hexamethylenetetramine (HMTA): Understanding the Role of HMTA in ZnO Nanowire Growth. *Langmuir* 2011, 27, (7), 3672-3677.
18). McPeak, K. M.; Becker, M. A.; Britton, N. G.; Majidi, H.; Bunker, B. A.; Baxter, J. B. In Situ X-ray Absorption Near-Edge Structure Spectroscopy of ZnO Nanowire Growth During Chemical Bath Deposition. *Chemistry of Materials* 2010, 22, (22), 6162-6170.
19). McPeak, K. M.; Opasanont, B.; Shibata, T.; Ko, D.-K.; Becker, M. A.; Chattopadhyay, S.; Bui, H. P.; Beebe, T. P.; Bunker, B. A.; Murray, C. B.; Baxter, J. B. Microreactor Chemical Bath Deposition of Laterally Graded Cd1—xZnxS Thin Films: A Route to High-Throughput Optimization for Photovoltaic Buffer Layers. *Chemistry of Materials* 2013, 25, (3), 297-306.
20). McPeak, K. M.; Baxter, J. B. ZnO Nanowires Grown by Chemical Bath Deposition in a Continuous Flow Microreactor. *Crystal Growth & Design* 2009, 9, (10), 4538-4545.
21). McPeak, K. M.; Baxter, J. B. Microreactor for High-Yield Chemical Bath Deposition of Semiconductor Nanowires: ZnO Nanowire Case Study. *Industrial & Engineering Chemistry Research* 2009, 48, (13), 5954-5961.
22). Guo, B.; Snow, S. D.; Starr, B. J.; Xagoraraki, I.; Tarabara, V. Photocatalytic inactivation of human adenovirus 40: Effect of dissolved organic matter and prefiltration. *Water Research* (Submitted 2016).
23). Snow, S. D.; Park, K.; Kim, J.-H. Cationic Fullerene Aggregates with Unprecedented Virus Photoinactivation Efficiencies in Water. *Environmental Science & Technology Letters* 2014, 1, (6), 290-294.
24). Snow, S. D.; Kim, K. C.; Moor, K. J.; Jang, S. S.; Kim, J.-H. Functionalized Fullerenes in Water: A Closer Look. *Environmental Science & Technology* 2015, 49, (4), 2147-2155.
25). Snow, S. D.; Lee, J.; Kim, J. H. Photochemical and photophysical properties of sequentially functionalized fullerenes in the aqueous phase. *Environmental Science & Technology* 2012, 46, (24), 13227-34.

26). Hazen, A. Water-Supply and Public Health. *Public health papers and reports* 1891, 17, 74-79.
27). Shannon, M. A.; Bohn, P. W.; Elimelech, M.; Georgiadis, J. G.; Marinas, B. J.; Mayes, A. M. Science and technology for water purification in the coming decades. *Nature* 2008, 452, (7185), 301-310.
28). McGuigan; Joyce; Conroy; Gillespie; Elmore, M. Solar disinfection of drinking water contained in transparent plastic bottles: characterizing the bacterial inactivation process. *Journal of Applied Microbiology* 1998, 84, (6), 1138-1148.
29). Gates, D. M. Spectral Distribution of Solar Radiation at the Earth's Surface. *Science* 1966, 151, (3710), 523-529.
30). UNICEF, Progress on drinking water and sanitation. WHO: 2012.
31). Baker, M.; Taras, M., The quest for pure water: The history of the Twentieth Century, Volume 1 and 2. American Water Works Association (AWWA), Denver, Colo.: 1981.
32). Downes, A.; Blunt, T. P. Researches on the effect of light upon bacteria and other organisms. *Proceedings of the Royal Society of London* 1877, 26, (179-184), 488-500.
33). Acra, A.; Karahagopian, Y.; Raffoul, Z.; Dajani, R. Disinfection of oral rehydration solutions by sunlight. *The Lancet* 1980, 316, (8206), 1257-1258.
34). Sommer, B.; Marino, A.; Solarte, Y.; Salas, M. L.; Dierolf, C.; Valiente, C.; Mora, D.; Rechsteiner, R.; Setter, P.; Wirojanagud, W.; Ajarmeh, H.; Al Hassan, A.; Wegelin, M. SODIS—An emerging water treatment process. *Journal of Water Supply Research and Technology-Aqua* 1997, 46, (3), 127-137.
35). McGuigan, K. G.; Conroy, R. M.; Mosler, H. J.; du Preez, M.; Ubomba-Jaswa, E.; Fernandez-Ibanez, P. Solar water disinfection (SODIS): A review from bench-top to roof-top. *Journal of Hazardous Materials* 2012, 235, 29-46.
36). Fujishima, A.; Honda, K. Electrochemical Photolysis of Water at a Semiconductor Electrode. *Nature* 1972, 238, (5358), 37-38.
37). Houas, A.; Lachheb, H.; Ksibi, M.; Elaloui, E.; Guillard, C.; Herrmann, J. M. Photocatalytic 18 degradation pathway of methylene blue in water. *Applied Catalysis B-Environmental* 2001, 31, (2), 145-157.
38). Bahnemann, D.; Bockelmann, D.; Goslich, R. Mechanistic Studies of Water Detoxification in Illuminated Tio2 Suspensions. *Sol Energ Mater* 1991, 24, (1-4), 564-583.
39). Maillard, C.; Guillard, C.; Pichat, P. Comparative Effects of the Tio2-Uv, H2o2-Uv, H2o2-Fe2+ Systems on the Disappearance Rate of Benzamide and 4-Hydroxybenzamide in Water. *Chemosphere* 1992, 24, (8), 1085-1094.
40). Herrmann, J. M.; Guillard, C.; Pichat, P. Heterogeneous Photocatalysis—an Emerging Technology for Water-Treatment. *Catalysis Today* 1993, 17, (1-2), 7-20.
41). Prairie, M. R.; Evans, L. R.; Stange, B. M.; Martinez, S. L. An Investigation of Tio2 Photocatalysis for the Treatment of Water Contaminated with Metals and Organic-Chemicals. *Environmental Science & Technology* 1993, 27, (9), 1776-1782.
42). Maurino, V.; Minero, C.; Mariella, G.; Pelizzetti, E. Sustained production of H 2 O2 on irradiated TiO2-fluoride systems. *Chemical Communications* 2005, (20), 2627-2629.
43). Tsukamoto, D.; Shiro, A.; Shiraishi, Y.; Sugano, Y.; Ichikawa, S.; Tanaka, S.; Hirai, T. Photocatalytic $H_2O_2$ production from ethanol/O2 system using TiO2 loaded with Au—Ag bimetallic alloy nanoparticles. *ACS Catalysis* 2012, 2, (4), 599-603.
44). Teranishi, M.; Naya, S.-i.; Tada, H. Temperature- and pH-Dependence of Hydrogen Peroxide Formation from Molecular Oxygen by Gold Nanoparticle-Loaded Titanium (IV) Oxide Photocatalyst. *The Journal of Physical Chemistry C* 2016, 120, (2), 1083-1088.
45). Teranishi, M.; Naya, S.-i.; Tada, H. In Situ Liquid Phase Synthesis of Hydrogen Peroxide from Molecular Oxygen Using Gold Nanoparticle-Loaded Titanium(IV) Dioxide Photocatalyst. *Journal of the American Chemical Society* 2010, 132, (23), 7850-7851.
46). Kormann, C.; Bahnemann, D. W.; Hoffmann, M. R. Photocatalytic production of $H_2O_2$ and organic peroxides in aqueous suspensions of TiO2, ZnO, and desert sand. *Environmental science & technology* 1988, 22, (7), 798-806.
47). Matsunaga, T.; Tomoda, R.; Nakajima, T.; Wake, H. Photoelectrochemical sterilization of microbial cells by semiconductor powders. *FEMS Microbiology Letters* 1985, 29, (1-2), 211-214.
48). Karunakaran, C.; Abiramasundari, G.; Gomathisankar, P.; Manikandan, G.; Anandi, V. Cu-doped TiO2 nanoparticles for photocatalytic disinfection of bacteria under visible light. *Journal of Colloid and Interface Science* 2010, 352, (1), 68-74.
49). Karunakaran, C.; Vijayabalan, A.; Manikandan, G.; Gomathisankar, P. Visible light photocatalytic disinfection of bacteria by Cd—TiO2. *Catalysis Communications* 2011, 12, (9), 826-829.
50). Li, X. Z.; Li, F. B. Study of Au/Au3+—TiO2 photocatalysts toward visible photooxidation for water and wastewater treatment. *Environmental Science & Technology* 2001, 35, (11), 2381-2387.
51). Hill, J. C.; Choi, K.-S. Effect of Electrolytes on the Selectivity and Stability of n-type WO3 Photoelectrodes for Use in Solar Water Oxidation. *The Journal of Physical Chemistry C* 2012, 116, (14), 7612-7620.
52). Wang, P.; Huang, B.; Qin, X.; Zhang, X.; Dai, Y.; Whangbo, M.-H. Ag/AgBr/WO3·H2O: Visible-Light Photocatalyst for Bacteria Destruction. *Inorganic Chemistry* 2009, 48, (22), 10697-10702.
53). Basnet, P.; Larsen, G. K.; Jadeja, R. P.; Hung, Y.-C.; Zhao, Y. α-Fe₂O₃ Nanocolumns and Nanorods Fabricated by Electron Beam Evaporation for Visible Light Photocatalytic and Antimicrobial Applications. *ACS Applied Materials & Interfaces* 2013, 5, (6), 2085-2095.
54). Meissner, D.; Memming, R.; Kastening, B. Photoelectrochemistry of cadmium sulfide. 1. Reanalysis of photocorrosion and flat-band potential. *The Journal of Physical Chemistry* 1988, 92, (12), 3476-3483.
55). Huang, L.; Peng, F.; Yu, H.; Wang, H. Preparation of cuprous oxides with different sizes and their behaviors of adsorption, visible-light driven photocatalysis and photocorrosion. *Solid State Sciences* 2009, 11, (1), 129-138.
56). Clavero, C. Plasmon-induced hot-electron generation at nanoparticle/metal-oxide interfaces for photovoltaic and photocatalytic devices. *Nat Photon* 2014, 8, (2), 95-103.
57). Brongersma, M. L.; Halas, N. J.; Nordlander, P. Plasmon-induced hot carrier science and technology. *Nat Nano* 2015, 10, (1), 25-34.
58). Manjavacas, A.; Liu, J. G.; Kulkarni, V.; Nordlander, P. Plasmon-Induced Hot Carriers in Metallic Nanoparticles. *ACS Nano* 2014, 8, (8), 7630-7638.
59). Mukherjee, S.; Libisch, F.; Large, N.; Neumann, O.; Brown, L. V.; Cheng, J.; Lassiter, J. B.;

Carter, E. A.; Nordlander, P.; Halas, N. J. Hot Electrons Do the Impossible: Plasmon-Induced Dissociation of H2 on Au. *Nano Letters* 2013, 13, (1), 240-247.

60). Tian, Y.; Tatsuma, T. Mechanisms and Applications of Plasmon-Induced Charge Separation at TiO2 Films Loaded with Gold Nanoparticles. *Journal of the American Chemical Society* 2005, 127, (20), 7632-7637.

61). Wu, K.; Chen, J.; McBride, J. R.; Lian, T. Efficient hot-electron transfer by a plasmon-induced interfacial charge-transfer transition. *Science* 2015, 349, (6248), 632-635.

62). Foote, C. S. Mechanisms of Photosensitized Oxidation—There Are Several Different Types of Photosensitized Oxidation Which May Be Important in Biological Systems. *Science* 1968, 162, (3857), 963-&.

63). Benabbou, A. K.; Derriche, Z.; Felix, C.; Lejeune, P.; Guillard, C. Photocatalytic inactivation of *Escherischia coli*—Effect of concentration of TiO2 and microorganism, nature, and intensity of UV irradiation. *Applied Catalysis B-Environmental* 2007, 76, (3-4), 257-263.

64). Cho, M.; Chung, H.; Choi, W.; Yoon, J. Linear correlation between inactivation of *E. coli* and OH radical concentration in TiO2 photocatalytic disinfection. *Water research* 2004, 38, (4), 1069-77.

65). Cho, M.; Chung, H.; Choi, W.; Yoon, J. Different inactivation behaviors of MS-2 phage and *Escherichia coli* in TiO2 photocatalytic disinfection. *Applied and Environmental Microbiology* 2005, 71, (1), 270-5.

66). Yan, G.; Chen, J.; Hua, Z. Roles of $H_2O_2$ and OH radical in bactericidal action of immobilized TiO2 thin-film reactor: An ESR study. *Journal of Photochemistry and Photobiology A: Chemistry* 2009, 207, (2-3), 153-159.

67). Gligorovski, S.; Strekowski, R.; Barbati, S.; Vione, D. Environmental Implications of Hydroxyl Radicals (●OH). *Chemical Reviews* 2015, 115, (24), 13051-13092.

68). Buxton, G. V.; Greenstock, C. L.; Helman, W. P.; Ross, A. B. Critical review of rate constants for reactions of hydrated electrons, hydrogen atoms and hydroxyl radicals (●OH/●O—) in aqueous solution. *J. Phys. Chem. Ref Data* 1988, 17, (2), 513-886.

69). Hotze, E. M.; Badireddy, A. R.; Chellam, S.; Wiesner, M. R. Mechanisms of bacteriophage inactivation via singlet oxygen generation in UV illuminated fullerol suspensions. *Environ Sci Technol* 2009, 43, (17), 6639-45.

70). Huang, L.; Xuan, Y.; Koide, Y.; Zhiyentayev, T.; Tanaka, M.; Hamblin, M. R. Type I and Type II mechanisms of antimicrobial photodynamic therapy: an in vitro study on gram-negative and gram-positive bacteria. *Lasers in surgery and medicine* 2012, 44, (6), 490-9.

71). Loeb, S.; Hofmann, R.; Kim, J.-H. Beyond the Pipeline: Assessing the Efficiency Limits of Advanced Technologies for Solar Water Disinfection. *Environmental Science & Technology Letters* 2016, 3, (3), 73-80.

72). Jayanti, S. V.; Park, J. H.; Dejneka, A.; Chvostova, D.; McPeak, K. M.; Chen, X.; On, S.-H.; Norris, D. J. Low-temperature enhancement of plasmonic performance in silver films. *Opt. Mater. Express* 2015, 5, (5), 1147-1155.

73). Zhou, M.; Diwu, Z.; Panchuk-Voloshina, N.; Haugland, R. P. A Stable Nonfluorescent Derivative of Resorufin for the Fluorometric Determination of Trace Hydrogen Peroxide: Applications in Detecting the Activity of Phagocyte NADPH Oxidase and Other Oxidases. *Analytical Biochemistry* 1997, 253, (2), 162-168.

74). Sundararaman, R.; Narang, P.; Jermyn, A. S.; Goddard Iii, W. A.; Atwater, H. A. Theoretical predictions for hot-carrier generation from surface plasmon decay. *Nat Commun* 2014, 5.

75). Zodrow, K.; Brunet, L.; Mahendra, S.; Li, D.; Zhang, A.; Li, Q. L.; Alvarez, P. J. J. Polysulfone ultrafiltration membranes impregnated with silver nanoparticles show improved biofouling resistance and virus removal. *Water Res* 2009, 43, (3), 715-723.

76). Kennedy, J. E., Jr.; Wei, C. I.; Oblinger, J. L. Methodology for enumeration of coliphages in foods. *Applied and environmental microbiology* 1986, 51, (5), 956-62.

77). Cho, M.; Lee, J.; Mackeyev, Y.; Wilson, L. J.; Alvarez, P. J.; Hughes, J. B.; Kim, J. H. Visible light sensitized inactivation of MS-2 bacteriophage by a cationic amine-functionalized C60 derivative. *Environ Sci Technol* 2010, 44, (17), 6685-91.

78). Wilkinson, F.; Helman, W. P.; Ross, A. B. Rate Constants for the Decay and Reactions of the Lowest Electronically Excited Singlet-State of Molecular-Oxygen in Solution—an Expanded and Revised Compilation. *J Phys Chem Ref Data* 1995, 24, (2), 663-1021.

79). Davies, M. J. Singlet oxygen-mediated damage to proteins and its consequences. *Biochemical and biophysical research communications* 2003, 305, (3), 761-70.

80). Wright, A.; Bubb, W. A.; Hawkins, C. L.; Davies, M. J. Singlet oxygen-mediated protein oxidation: evidence for the formation of reactive side chain peroxides on tyrosine residues. *Photochemistry and photobiology* 2002, 76, (1), 35-46.

81). Fiers, W.; Contreras, R.; Duerinck, F.; Haegeman, G.; Iserentant, D.; Merregaert, J.; Min Jou, W.; Molemans, F.; Raeymaekers, A.; Van den Berghe, A.; Volckaert, G.; Ysebaert, M. Complete nucleotide sequence of bacteriophage MS2 RNA: primary and secondary structure of the replicase gene. *Nature* 1976, 260, (5551), 500-7.

82). Dean, R. T.; Fu, S.; Stocker, R.; Davies, M. J. Biochemistry and pathology of radical-mediated protein oxidation. *The Biochemical journal* 1997, 324 (Pt 1), 1-18.

83). Grune, T.; Klotz, L. O.; Gieche, J.; Rudeck, M.; Sies, H. Protein oxidation and proteolysis by the nonradical oxidants singlet oxygen or peroxynitrite. *Free radical biology & medicine* 2001, 30, (11), 1243-53.

84). Ivask, A.; Suarez, E.; Patel, T.; Boren, D.; Ji, Z.; Holden, P.; Telesca, D.; Damoiseaux, R.; Bradley, K. A.; Godwin, H. Genome-Wide Bacterial Toxicity Screening Uncovers the Mechanisms of Toxicity of a Cationic Polystyrene Nanomaterial. *Environ Sci Technol* 2012.

85). Cho, M.; Snow, S. D.; Hughes, J. B.; Kim, J. H. *Escherichia coli* Inactivation by UVC-Irradiated C60: kinetics and mechanisms. *Environmental Science & Technology* 2011, 45, (22), 9627-33.

86). Matsuo, T.; Shinzawa, H.; Togashi, H.; Aoki, M.; Sugahara, K.; Saito, K.; Saito, T.;

Takahashi, T.; Yamaguchi, I.; Aoyama, M.; Kamada, H. Highly sensitive hepatitis B surface antigen detection by measuring stable nitroxide radical formation with ESR spectroscopy. *Free Radic. Biol. Med.* 1998, 25, (8), 929-935.

87). Yamakoshi, Y.; Umezawa, N.; Ryu, A.; Arakane, K.; Miyata, N.; Goda, Y.; Masumizu, T.; Nagano, T. Active oxygen species generated from photoexcited fullerene (C60) as potential medicines: O2-versus 102. *Journal of the American Chemical Society* 2003, 125, (42), 12803-12809.

88). Hassan, M.; Okeil, A. *Field and Laboratory Investigation of Photocatlytic Pavements*; Louisiana State University: Baton Rouge, 2011.
89). Agency, U. S. E. P., Evaluation of Ecological Impacts from Highway Development. U.S. Environmental Protection Agency: Washington, D C, 1994.
90). Kuhns, H. D.; Mazzoleni, C.; Moosmüller, H.; Nikolic, D.; Keislar, R. E.; Barber, P. W.; Li, Z.; Etyemezian, V.; Watson, J. G. Remote sensing of PM, NO, CO and HC emission factors for on-road gasoline and diesel engine vehicles in Las Vegas, Nev. *Science of The Total Environment* 2004, 322, (1-3), 123-137.
91). Baldauf, R.; Thoma, E.; Hays, M.; Shores, R.; Kinsey, J.; Gullett, B.; Kimbrough, S.; Isakov, V.; Long, T.; Snow, R.; Khlystov, A.; Weinstein, J.; Chen, F. L.; Seila, R.; Olson, D.; Gilmour, I.; Cho, S. H.; Watkins, N.; Rowley, P.; Bang, J. Traffic and meteorological impacts on near-road air quality: summary of methods and trends from the Raleigh Near-Road Study. *Journal of the Air & Waste Management Association* (1995) 2008, 58, (7), 865-78.
92). Berkowicz, R.; Winther, M.; Ketzel, M. Traffic pollution modelling and emission data. *Environmental Modelling & Software* 2006, 21, (4), 454-460.
93). Thoma, E. D.; Shores, R. C.; Isakov, V.; Baldauf, R. W. Characterization of near-road pollutant gradients using path-integrated optical remote sensing. *J Air Waste Manag Assoc* 2008, 58, (7), 879-90.

The embodiments illustrated and discussed in this specification are intended only to teach those skilled in the art how to make and use the invention. In describing embodiments of the disclosure, specific terminology is employed for the sake of clarity. However, the disclosure is not intended to be limited to the specific terminology so selected. The above-described embodiments of the disclosure may be modified or varied, without departing from the invention, as appreciated by those skilled in the art in light of the above teachings. It is therefore to be understood that, within the scope of the claims and their equivalents, the invention may be practiced otherwise than as specifically described. For example, it is to be understood that the present disclosure contemplates that, to the extent possible, one or more features of any embodiment can be combined with one or more features of any other embodiment.

I claim:

1. A metal-semiconductor-metal (MSM) plasmonic device comprising:
   a substrate;
   a metal layer deposited on the substrate, the metal layer being substantially reflective in at least the visible wavelength range;
   an oxide layer deposited on the metal layer; and
   gold or gold-alloy nanoparticles deposited on a surface of the oxide layer,
   wherein the gold or gold-alloy nanoparticles are spaced apart from the metal layer by a thickness of the oxide layer on the surface of which the gold or gold-alloy nanoparticles are deposited, and
   wherein the oxide layer is an oxide doped layer and the oxide layer is doped with a dopant selected from the group consisting of Al, Ga, F, and Mg, wherein the dopant replaces an oxygen atom at various locations within a lattice of the oxide layer to adjust band positions of the oxide layer to facilitate carrier injection and to improve chemical resistance.

2. The device according to claim 1, wherein the substrate comprises silicon (Si), glass or a polyimide film.

3. The device according to claim 1, wherein a size of the substrate is 50 mm by 50 mm.

4. The device according to claim 1, wherein the metal layer comprises aluminum (Al), copper (Cu), gold (Au), or silver (Ag).

5. The device according to claim 1, wherein the oxide layer comprises zinc oxide (ZnO), $WO_3$, $TiO_2$, $SrTiO_3$, $SnO_2$, or $BiVO_4$ layer.

6. The device according to claim 1, wherein the gold or gold alloy nanoparticles are configured to absorb 90% or more of incident light at a wavelength in the visible region.

7. The device according to claim 6, wherein the wavelength in the visible region is centered around 600 nm.

8. The device according to claim 1, wherein the device is light polarization independent.

9. The device according to claim 1, wherein a size of the gold nanoparticles is in the range from 5 nm to 100 nm.

10. A method of making the metal-semiconductor-metal (MSM) plasmonic device of claim 1, the method comprising:
    depositing the metal layer on the substrate, the metal layer being substantially reflective in at least the visible wavelength range;
    depositing the oxide layer on the metal layer; and
    depositing the gold or gold alloy nanoparticles on the oxide layer.

11. The method according to claim 10, wherein depositing the metal layer comprises forming an aluminum layer on the substrate by rapidly thermally evaporating aluminum on the substrate.

12. The method according to claim 10, wherein the step of depositing the oxide layer comprises forming the oxide layer by spin coating a sol-gel oxide layer on the metal layer.

13. The method according to claim 12, further comprising converting the sol-gel oxide layer into the oxide layer by annealing.

14. The method according to claim 10, wherein depositing the gold or gold alloy nanoparticles further comprises forming the gold or gold alloy nanoparticles from a gold or gold alloy film thermally evaporated on the oxide layer, and heating and thermally dewetting the gold or gold alloy film to form the gold or gold alloy nanoparticles.

15. The method according to claim 10, further comprising forming the gold or gold alloy nanoparticles by evaporation through a colloidal lithographic mask.

16. A method of disinfecting water comprising:
    contacting water to be decontaminated with a device according to claim 1; and
    illuminating the device with infrared light, visible light, or ultraviolet light, or any combination thereof.

17. The method according to claim 16, wherein illuminating the device with infrared light, visible light, or ultraviolet light, or any combination thereof comprises illuminating the device with sunlight.

18. The device according to claim 1, wherein the gold or gold alloy nanoparticles are nanorods.

* * * * *